(12) United States Patent
Oleynikova et al.

(10) Patent No.: US 12,374,040 B2
(45) Date of Patent: Jul. 29, 2025

(54) ENVIRONMENT RECONSTRUCTION AND PATH PLANNING FOR AUTONOMOUS SYSTEMS AND APPLICATIONS

(71) Applicant: NVIDIA Corporation, Santa Clara, CA (US)

(72) Inventors: Elena Oleynikova, Zurich (CH); Alexander James Millane, Zurich (CH); Emilie Lucie Eloïse Wirbel, Nogent-sur-Marne (FR)

(73) Assignee: NVIDIA Corporation, Santa Clara, CA (US)

( * ) Notice: Subject to any disclaimer, the term of this patent is extended or adjusted under 35 U.S.C. 154(b) by 317 days.

(21) Appl. No.: 17/654,930

(22) Filed: Mar. 15, 2022

(65) Prior Publication Data

US 2023/0298268 A1    Sep. 21, 2023

(51) Int. Cl.
*G05D 1/00* (2024.01)
*B60W 30/09* (2012.01)
(Continued)

(52) U.S. Cl.
CPC .............. *G06T 17/05* (2013.01); *B60W 30/09* (2013.01); *B60W 60/0015* (2020.02);
(Continued)

(58) Field of Classification Search
CPC ....................................................... G06T 1/05
See application file for complete search history.

(56) References Cited

U.S. PATENT DOCUMENTS 10,885,698 B2    1/2021   Muthler et al.
11,233,937 B1 *  1/2022   Solenberg ............ G05D 1/0274
(Continued)

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
(Continued)

*Primary Examiner* — Vivek D Koppikar
*Assistant Examiner* — Paul W Arellano
(74) *Attorney, Agent, or Firm* — Shook, Hardy & Bacon L.L.P.

(57) ABSTRACT

Approaches for environment reconstruction and path planning for autonomous machine systems and applications are described. An iterative volumetric mapping function for an ego-machine may compute a distance field, and from the distance field derive a cost map representing a volumetric reconstruction of the physical environment around the ego-machine. The cost map may be used for collision avoidance and path planning. The iterative volumetric mapping function may also optionally compute a color integration map and visualization mesh from the distance field that can be used for visualization of the physical environment around the ego-machine. The cost map may be computed as a Euclidean Signed Distance Field (ESDF) and the distance field from which the cost map is computed may include a Truncated Signed Distance Field (TSDF). The distance field, cost map, color integration map and visualization mesh may each be stored in memory as maps of a plurality of map layers.

24 Claims, 14 Drawing Sheets

(51) Int. Cl.

| | |
|---|---|
| *B60W 60/00* | (2020.01) |
| *G06F 16/22* | (2019.01) |
| *G06T 1/20* | (2006.01) |
| *G06T 7/50* | (2017.01) |
| *G06T 17/05* | (2011.01) |
| *G06T 17/20* | (2006.01) |
| *G06V 20/58* | (2022.01) |

(52) U.S. Cl.
CPC ............ *G06F 16/2272* (2019.01); *G06T 1/20* (2013.01); *G06T 7/50* (2017.01); *G06T 17/20* (2013.01); *G06V 20/58* (2022.01); *B60W 2420/403* (2013.01); *B60W 2420/408* (2024.01); *B60W 2552/05* (2020.02); *B60W 2556/40* (2020.02); *G05D 1/0214* (2013.01); *G05D 1/0231* (2013.01); *G05D 1/101* (2013.01); *G06T 2200/04* (2013.01); *G06T 2200/08* (2013.01); *G06T 2207/10024* (2013.01); *G06T 2207/10028* (2013.01); *G06T 2207/30244* (2013.01); *G06T 2207/30261* (2013.01); *G06T 2215/12* (2013.01)

(56) References Cited

U.S. PATENT DOCUMENTS

| | | | | |
|---|---|---|---|---|
| 2004/0066316 | A1* | 4/2004 | Ogawa | G01C 21/3852 345/501 |
| 2018/0188045 | A1* | 7/2018 | Wheeler | G06V 10/98 |
| 2018/0261007 | A1* | 9/2018 | Stacey | G06T 9/00 |
| 2019/0355173 | A1* | 11/2019 | Gao | G06T 19/20 |
| 2020/0073399 | A1* | 3/2020 | Tateno | G05D 1/0251 |
| 2020/0159227 | A1* | 5/2020 | Cohen | G05D 1/024 |
| 2021/0397857 | A1* | 12/2021 | Liu | G06V 20/58 |

OTHER PUBLICATIONS

ISO 26262, "Road vehicle—Functional safety," International standard for functional safety of electronic system, Sep. 13, 2021, <https://en.wikipedia.org/wiki/ISO_26262>, 8 pages.

"Taxonomy and Definitions for Terms Related to Driving Automation Systems for On-Road Motor Vehicles," National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles," National Highway Traffic Safety Administration (NHTSA), A Division of the US Department of Transportation, and the Society of Automotive Engineers (SAE), Standard No. J3016-201806, pp. 1-35 (Jun. 15, 2018).

Cao, Thanh-Tung et al., "Parallel Banding Algorithm to Compute Exact Distance Transform with the GPU," School of Computing, National University of Singapore, 8 pages.

Newcombe, Richard A. et al., "KinectFusion: Real-Time Dense Surface Mapping and Tracking," 10 pages.

Oleynikova, Helen et al., "An Open-Source System for Vision-Based Micro-Aerial Vehicle Mapping, Planning, and Flight in Cluttered Environments," Autonomous Systems Lab, ETH Zurich, 38 pages.

Oleynikova, Helen et al., "Signed Distance Fields: A Natural Representation for Both Mapping and Planning," Autonomous Systems Lab, ETH Zurich, 6 pages.

Lorensen, W.E. and Cline, H.E., "Marching cubes: A high resolution 3D surface construction algorithm," ACM, Computer Graphics, vol. 21, No. 4, Jul. 1987, <https://dl.acm.org/doi/10.1145/37402.37422>, 7 pages.

Pirovano M., "Kinfu—an open source implementation of Kinect Fusion + case study: implementing a 3D scanner with PCL," 3D structure from visual motion 2011/2012, Project Assignment at POLIMI, The University of Milan, 2013, <http://www.michelepirovano.com/pdf/3d-scanning-pcl.pdf>, 20 pages.

Prisacariu, V.A. et al., "InfiniTAM v3: A framework for Large-Scale 3D Reconstruction with Loop Closure," 2017, <https://arxiv.org/abs/1708.00783>, 19 pages.

Whelan, T. et al., "ElasticFusion: Dense SLAM Without a Pose Graph," Dyson Robotics Laboratory at Imperial College, Department of Computing, Jul. 2015, <http://www.roboticsproceedings.org/rss11/p01.pdf>, 9 pages.

Niebner, M. et al., "Real-time 3D Reconstruction at Scale Using Voxel Hashing," ACM Transactions on Graphics (ToG), vol. 32, No. 6, 2013, <https://niessnerlab.org/papers/2013/4hashing/niessner2013hashing.pdf>, 11 pages.

Oleynikova, H. et al., "Voxblox: Incremental 3D Euclidean Signed Distance Fields for On-Board MAV Planning," In 2017 IEEE/RSJ International Conference on Intelligent Robots and Systems (IROS), IEEE, Sep. 2017, <https://arxiv.org/abs/1611.03631>, 8 pages.

Han L. et al., "Fiesta: Fast Incremental Euclidean Distance Fields for Online Motion Planning of Aerial Robots," In 2019 IEEE/RSJ International Conference on Intelligent Robots and Systems (IROS), IEEE, Nov. 2019, <https://arxiv.org/abs/1903.02144>, 8 pages.

\* cited by examiner

ENVIRONMENT RECONSTRUCTION AND PATH PLANNING FOR AUTONOMOUS SYSTEMS AND APPLICATIONS

BACKGROUND

A machine operating autonomously or semi-autonomously is expected to detect and avoid obstacles by either navigating around the obstacles, or stopping before an obstacle is reached. As such, the ability to safely identify and plan a path to navigate around obstacles is a relevant task for any autonomous or semi-autonomous driving ego-machine. For example, an adequate perception-based path planning system is expected to be robust to detecting different types of obstacles and include the capacity to detect the position of obstacles with a sufficient accuracy and speed that allows the machine enough time to avoid a collision.

In order to provide both mobility and flexibility in complex, frequently changing environments, sensor-based technologies have been developed for use with autonomously or semi-autonomously operating machines that create a representation of the ego-machine's surroundings so that potential navigation plans can be tested for potential collisions. 2D LiDAR technologies are often used with logistic autonomous mobile robots (AMRs), which may refer to a type of robot that can understand and autonomously move through its environment. Currently, AMRs are limited in their autonomy, with most being limited to following predetermined routes marked by magnetic strips, and using LiDAR sensor processing to perform safety stops. 3D LiDAR measures scene geometry more accurately than 2D LiDAR, and can function by observing objects at greater distance. This has made 3D LiDAR a sensor of choice for autonomous operation and/or navigation, where the ability to accurately perceive an obstacle at a large distance has a substantial impact on the safety of the system. However, LiDAR sensors, particularly 3D LiDAR sensors, are currently expensive enough in component costs to make outfitting 3D LiDAR technologies for large fleets of autonomous and semi-autonomous machines, such as AMRs, cost prohibitive.

Cameras are typically far less expensive than LiDAR sensors, and while they typically give less precise geometry information than 3D LiDAR, cameras provide a large amount of semantically-relevant data that can be used to further improve navigation (e.g., dynamic obstacle classification and tracking). Vision-based perception using camera captured images presents a significant challenge, however, in part due to the complexity of the algorithms involved, and in part due to the compute required to run them. For example, existing solutions using RGB-D sensors—a depth-sensing device that also captures RGB (red, green, and blue color) image frames—can be broadly divided into two classes of solutions: (1) those that are intended for surface reconstruction only, and (2) those that run on powerful central processing unit (CPU)-based systems. The first class of solutions can produce highly accurate surface reconstructions from depth-camera data using processes executed on a graphics processing unit (GPU). However, while they produce visually appealing reconstructions, those reconstructions represent surfaces, and not volumetric regions of space that have been observed to be free from obstacles. Because an important purpose of creating maps for a robotic ego-machine may be to capture free-space where the ego-machine can move, surface reconstructions may be limited in usefulness for path planning. The second class of solutions can build volumetric reconstructions suitable for ego-machine path planning, but are computationally expensive, which can limit responsiveness to dynamic or safety-critical environments. Further, this class of solutions use algorithms running on powerful (and thus expensive) CPUs that may be too expensive to implement at scale for a fleet of ego-machines.

SUMMARY

Embodiments of the present disclosure relate to environment reconstruction and path planning for autonomous systems and applications. Systems and methods are disclosed that may be used to assist an autonomous or semi-autonomous machine (e.g., an "ego-machine" as implemented in one or more embodiments of the present disclosure) in detecting obstacles in order to plan its path of travel.

In contrast to existing environment reconstruction technologies, the systems and methods presented in this disclosure may compute cost maps suitable for ego-machine path planning, using parallelized computations performed by threads, for example, on a graphics processing unit (GPU) and/or one or more parallel processing units (PPUs). In some embodiments, an iterative volumetric mapping function may compute a distance field, and from the distance field derive a cost map representing a volumetric reconstruction of the physical environment around the ego-machine. The cost map may be used for collision avoidance and path planning. In some embodiments, the iterative volumetric mapping function may also optionally compute a color integration map and visualization mesh from the distance field that can be used for visualization of the physical environment around the ego-machine. In some embodiments, the cost map is computed as a Euclidean Signed Distance Field (ESDF) and the distance field from which the cost map is computed comprises a Truncated Signed Distance Field (TSDF). The distance field, cost map, color integration map and visualization mesh may all be stored in a memory respectively as a set or subset of one or more layers of a plurality of map layers. In addition to the environmental characteristics captured in the distance field and cost maps, the map layers can be used to store additional quantities of interest which are spatially varying in the form of a 3D grid.

The input data for computing the distance field may include a stream of depth images, pose data, and raster-based images, captured, for example, by one or more image capturing sensors such as, but not limited to RGB-D sensors. The pose data may be generated from various sources, such as but not limited to data from Visual Simultaneous Localization and Mapping (VSLAM) processed stereo image pairs, and/or from external sensor data processed off-board the ego-machine.

In some embodiments, the iterative volumetric mapping function identifies updates to a first map comprising the distance field to determine how to update a second map comprising the cost map. Depending on how 3D elements of the first map change from one processing iteration to the next, 3D elements of the second map may be either cleared or updated without needing to reconstruct the entire map, thereby preserving processing power. In some embodiments, the iterative volumetric mapping function uses wavefront processes to iteratively propagate clearing or updating of voxels belonging to blocks of 3D elements that are neighboring blocks of updated blocks, until there are no remaining blocks with 3D elements to be cleared or updated.

BRIEF DESCRIPTION OF THE DRAWINGS

The present systems and methods for environment reconstruction and path planning for autonomous systems and applications are described in detail below with reference to the attached drawing figures, wherein.

DETAILED DESCRIPTION

Figure 1:
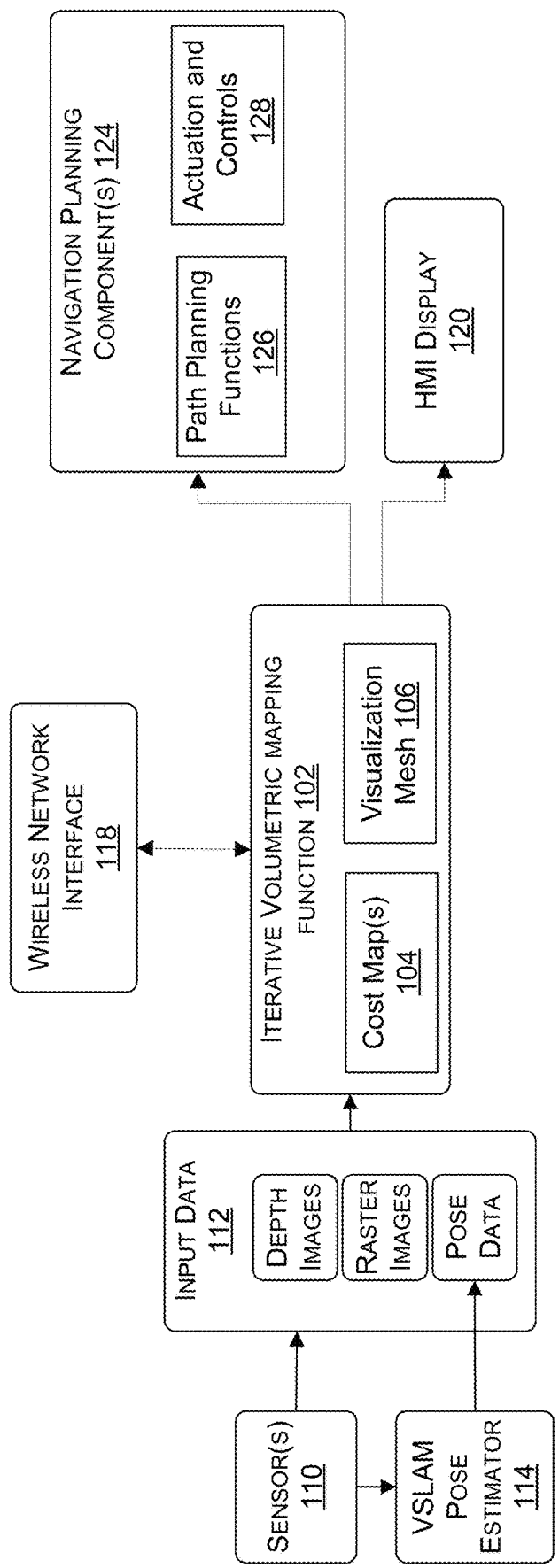
FIG. 1 is an illustration of an example flow diagram for an environment mapping system of an ego-machine, in accordance with some embodiments of the present disclosure.

Systems and methods are disclosed related to environment reconstruction and path planning for autonomous systems and applications. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to ego-machine path planning, this is not intended to be limiting, and the systems and methods described herein may be used in augmented reality, virtual reality, mixed reality, robotics, synthetic data generation, content creation, simulation, security and surveillance, autonomous or semi-autonomous machine applications, and/or any other technology spaces where ego-machine path planning may be used.

The present disclosure relates to volumetric mapping of the space around an ego-machine for use in path planning and visualization. Systems and methods presented in this disclosure may assist an ego machine in creating a volumetric reconstruction of its environment. A volumetric mapping function may be used for generating a cost map that may be used by a path planner to navigate the ego-machine through its environment while avoiding collision with obstacles. An ego-machine is expected to detect and avoid obstacles by either navigating around the obstacles, or stopping before an obstacle is reached. As such, the ability to safely identify and plan a path to navigate around obstacles is a relevant task for any autonomous or semi-autonomous navigating ego-machine. For example, an adequate perception-based path planning system is expected to be robust to detecting different types of obstacles and include the capacity to detect the position of obstacles with a sufficient accuracy and speed that allows the ego-vehicle enough time to avoid a collision and to plan alternate paths to avoid or minimize undue delays as a result of obstacles in its path.

The systems and methods presented in this disclosure may compute Euclidean Signed Distance Field– (ESDF–) based cost maps suitable for ego-machine path planning, using parallelized computations performed by threads on a graphics processing unit (GPU) and/or one or more parallel processing units (PPUs) or accelerators. For example, an iterative volumetric mapping function is disclosed where a plurality of kernels may receive input data generated by one or more sensors. The iterative volumetric mapping function may compute a distance function (or cost map) representing a volumetric reconstruction of the physical environment around the ego-machine. The cost map may be used for collision avoidance and path planning. In some embodiments, the iterative volumetric mapping function may also optionally compute a visualization mesh that can be used for visualization of the physical environment around the ego-machine.

The input data may include a stream of depth images, pose data, and raster-based images, captured, for example, by one or more image capturing sensors such as, but not limited to RGB-D sensors. In some embodiments, other sources of input data may comprise data from a stereo camera, a LiDAR sensor, a RADAR sensor, an ultrasonic or other SONAR sensor, an infrared camera, a monocular camera, a surround camera, wide-view camera, a fisheye camera, a long-range camera, or a mid-range camera. The raster-based image data may comprise a stream of images that include color and/or luminance (greyscale) image information. The pose data may be generated from various sources, such as, but not limited to data from Simultaneous Localization and Mapping (SLAM) processed onboard sensor data, and/or from external sensor data processed off-board the ego-machine.

The cost map may be used by one or more downstream navigation components used for path planning, object avoidance, localization, and/or other operations for controlling the ego-machine as it travels through an environment. The visualization mesh can be used for visualization of the physical environment around the ego-machine and/or object detection and/or classification. While not critical for path planning, a renderable surface representation is useful for visualizing the world as perceived by the ego-machine, for example, to provide a remote operator a better understanding of the ego-machine's environment. In some embodiments, the visualization mesh may be remotely accessed by an operator or other system via a wireless network interface.

In some embodiments, the iterative volumetric mapping function is carried out in a parallelized manner using a plurality of threads executed on a GPU(s) and/or one or more other parallel processing units (PPUs). 3D elements within the maps (such as Voxels and/or other 3D elements) produced from the input data are organized into blocks, and those blocks are processed for updating in parallel by the threads. In some embodiments, subsections of the maps are processed incrementally when voxel state updates are detected so that voxels in unchanged subsections are not recalculated.

The iterative volumetric mapping function may generate a Truncated Signed Distance Field (TSDF) or other form of map representation that fuses incoming depth images into a 3D TSDF (distance field) represented as samples on a 3D element grid. From the TSDF, the iterative volumetric mapping function generates a Euclidean Signed Distance Field (ESDF) as the cost map (or other form of cost map) that may be used by the path planning function.

The distance measurement for a given 3D element (e.g., voxel) in a projective distance field map representation (such as a TSDF, for example) may comprise a distance to a surface of a physical object along a ray extending from the center of the sensor through the 3D element (e.g., between the sensor and the object). However, a TSDF may be truncated to have values for only the voxels near the surface (within 2 to 4 voxels or within another threshold distance, for example). In contrast, the distance measurement for a given 3D element in a Euclidean distance field map representation for a cost map (such as an ESDF cost map, for example) may correspond to a Euclidean distance to the nearest surface of the physical object (that is, the Euclidean distance to the nearest voxel considered to be on the surface of the object).

In some embodiments, the iterative volumetric mapping function comprises a TSDF integration that generates a first map comprising a TSDF represented as a first plurality of samples on a 3D voxel grid. The TSDF may be computed based at least in part on the input data, including depth images (or more generally depth and image data) and pose data. The TSDF may be stored as a map in a TSDF layer of the GPU memory. The iterative volumetric mapping function may also comprise an ESDF integration that generates an ESDF represented as a second plurality of samples on the 3D voxel grid. The ESDF may be computed based at least in part on updates to one or more blocks of voxels of the first map, and stored to the GPU memory as a map in an ESDF layer. In some embodiments, the memory of the GPU may be structured into a plurality of map layers where a TSDF layer(s) and an ESDF layer(s) are layers of that structure. Voxels represented in maps by one or more of the plurality of map layers may be stored as blocks, wherein each of the blocks can be independently referenced by an index.

In some embodiments, the iterative volumetric mapping function may further comprise a color integration that generates a color integration map comprising a re-projection of the TSDF onto a synthetic depth image based at least in part on the pose data and a color integration based at least on raster image data from the input data. The iterative volumetric mapping function may also further comprise a mesh integration that generates a visualization map comprising a polygonal mesh representation of the TSDF. In some embodiments, the visualization map is at least in part generated using the color integration map. In some embodiments, the color integration map may be stored as a map in a color layer of the GPU memory, and the visualization map in a mesh layer of the GPU memory.

In some embodiments, the iterative volumetric mapping function executes a kernel that may be referred to as the "mark sites" kernel that receives as input a list of updated blocks from the TSDF integration, indicating blocks of the TSDF that have been updated. The mark sites kernel evaluates a current state of the voxels against their voxel state as indicated in the TSDF layer and their voxel state as indicated in the ESDF layer. When the mark sites kernel finds blocks that have at least one voxel that was previously associated with a surface of the object (referred to as a "site" voxel), but that has now become not associated with the surface of the object, the mark sites kernel assigns them to a first set of updated blocks (referred to as "Blocks to Clear").

In one or more embodiments, blocks of that first set may be applied to a raise wavefront process to clear one or more voxels in the map stored in the ESDF layer that correspond to those in the Blocks to Clear. The raise wavefront process may also iteratively propagate clearing of voxels belonging to ESDF blocks that are neighboring blocks of the first set of updated blocks, until there are no remaining blocks of the ESDF with voxels to be cleared.

In contrast, when the mark sites kernel finds blocks that have at least one voxel that was not previously associated with a surface of the object, but that has now become associated with the surface of the object, the mark sites kernel may assign them to a second set of updated blocks (referred to as "Blocks with Sites"). Blocks of that second set may be applied to a lower wavefront process to update one or more voxels in the map stored in the ESDF layer that correspond to those Blocks with Sites. The lower wavefront process may also iteratively propagate updates of voxels belonging to ESDF blocks that are neighboring blocks of the second set of updated blocks, until there are no remaining blocks of the ESDF with voxels to be updated. In some embodiments, the iterative volumetric mapping function may complete the raise wavefront process before proceeding to applying the lower wavefront process.

In addition to the environmental characteristics captured in the TSDF layer, the color layer, the mesh layer, and the ESDF layer, there may exist several additional quantities of interest which are spatially varying and desirable to represent in memory of the GPU (e.g., in the form of a 3D grid). For example, the ego-machine may comprise a cleaning robot for keeping debris off the floor and the additional quantities may correspond to the type of debris on the floor. In various embodiments, it may be important for the ego-machine to specifically discern when people are present. The iterative volumetric mapping function may therefore also store other various datatypes generated by threads over a 3D grid as map layers. As such, the map layers may comprise stacks of additional layers in which the grids of each layer are collocated and/or correlated with one another. In some embodiments, the map layers may be implemented using a GPU library comprising algorithms and functions for storing data generated by the GPU kernels into the map layers for fast access, as well as providing tools for interacting with the individual layers of the map layers (such as, but not limited to saving and retrieving data).

The path travelled by the ego-machine is not limited to any one type of path or surface and may include paths such as, but not limited to, a floor space, a delineated portion of an environment, a hallway, a corridor, a paved road, an unpaved road, a highway, a driveway, a portion of a parking lot, a trail, a track, a walking path, a flight path, a runway, or other free space.

The output generated by the iterative volumetric mapping function may include a cost map and a visualization mesh, used to plan a path of the ego-machine and/or to display a location of obstacles to an operator or observer of the ego-machine, or otherwise used by one or more downstream components of the ego-machine. In some embodiments, communication between the iterative volumetric mapping function and such downstream components of the ego-machine is implemented via an application programing interface (API).

The iterative volumetric mapping function and corresponding methods may be executed at least in part on at least one graphics processing unit that may operate in conjunction with software executed on a central processing unit coupled to a memory. The graphics processing unit may be programmed to execute kernels to implement one or more of the features and functions of the iterative volumetric mapping function to compute cost maps, visualization meshes, Truncated Signed Distance Fields, Euclidean Signed Distance Fields, color integration maps, and other functions described herein. While in some embodiments, all processing is performed onboard the ego-machine, in other embodiments, some features and functions of the iterative volumetric mapping function may be distributed and performed by a combination of onboard processors and cloud computing resources, and sensor data obtained from onboard sensors augmented with supplemental data obtained from a data center or other server or sensors. In such implementations, the ego-machine further comprises at least one wireless communication interface for coupling the iterative volumetric mapping function to a wireless communications network.

Although the use of a graphics processing unit (GPU) is discussed with respect to some of the embodiments presented herein, the iterative volumetric mapping function and corresponding methods may in other embodiments be executed at least in part as threads on one or more hardware accelerators (including, without limitation, a data processing unit (DPU), a vector processing unit or vision processing unit (VPU), a tensor core or tensor processing unit (TPU), a deep learning accelerator (DLA), or programmable vision accelerator (PVA), or other parallel processing units (PPUs), etc.), field programmable gate arrays (FPGAs), or Application Specific Integrated Circuits (ASICs). That said, the iterative volumetric mapping function and corresponding methods are not precluded from being performed in an iterative approach that does not use parallel processing, so that for any of the embodiments discussed herein, the iterative volumetric mapping function may be carried out by non-parallel processing units.

In the field of 3D computer graphics, the term "voxel" may refer to a type of 3D element that represents a value on a grid in 3D space. It should be understood that the term "voxel" is used in the present disclosure for illustrative purposes and not for purposes of limitation, and that other forms of 3D elements may be substituted for voxels in and of the embodiments discussed herein. Similarly, the truncated signed distance fields and Euclidean signed distance fields presented herein are used as example fields for producing map representations of distances, not to preclude the use of other fields.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example data flow diagram illustrating at 100 the interconnection of components and flow of information or data for an environment mapping system for an ego-machine (such as the autonomous machine 800 discussed below with respect to FIG. 8A), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous machine 800 of FIGS. 8A-8D, example computing device 900 of FIG. 9, and/or example data center 1000 of FIG. 10.

As shown in FIG. 1, the environment mapping system executing the process 100 includes an iterative volumetric mapping function 102 that receives input data 112 and computes a distance function (which may be in the form of a cost map) 104 representing the physical environment around the ego-machine. The cost map 104 can be output from the iterative volumetric mapping function 102 and used for collision avoidance and path planning. In some embodiments, the iterative volumetric mapping function 102 may also optionally compute a visualization mesh 106, which can be used for visualization of the physical environment around the ego-machine.

In at least one embodiment, the input data 112 may include image data and/or sensor data. For example, where the input data 112 includes image data, the image data may represent one or more images that depict one or more portions of objects in the environment through which the ego-machine travels. As shown, the input data 112 may include a stream of depth images and pose data, and raster-based images, from which the iterative volumetric mapping function 102 generates a scene reconstruction, a collision field, and a mesh, as discussed below.

In at least one embodiment, the input data 112 may include image data generated using one or more sensors 110 of the ego-machine (such as one or more on-board cameras) and/or sensors 110 external to the ego-machine, such as one or more cameras of a robot and/or another mobile or stationary machine(s) or device(s). For example, the iterative volumetric mapping function 102 may be coupled to a wireless network interface 118 via which it may receive additional input data captured by off device sensors. The input data 112 may include data representative of images of a field of view of one or more cameras, such as a stereo camera(s), a wide-view camera(s) (e.g., fisheye cameras), infrared camera(s), surround camera(s) (e.g., 360 degree cameras), long-range and/or mid-range camera(s), and/or other camera types. In some embodiments, the input data 112 may additionally or alternatively include other types of sensor data, such as LIDAR data from one or more LIDAR sensors, RADAR data from one or more RADAR sensors, etc.

The image data may represent a stream of raster-based images (e.g., pixels) that include color and/or luminance (greyscale) image information. In some embodiments, the image data may also represent depth information corresponding to the pixels of the images. By way of example, and not limitation, the depth and raster images may be captured using one or more RGB-D images. In various examples, the depth information may be provided separately from the raster images. For example, the sensors 110 may comprise an RGB-D camera, that includes at least two infrared (IR) sensors from which depth is computed for one or more pixels, and an RGB camera to produce input data 112 that includes a stream of depth and color images. As further examples, the sensors 110 may comprise a pair of RGB cameras arranged and synchronized to operate as a stereo pair. In that case, the depth images may be computed from the output from the stereo pair using a stereo matching algorithm, and the RGB images may be used as the raster images.

In some examples, the image data may be captured in one format (e.g., RCCB, RCCC, RBGC, etc.), and then converted to another format (e.g., by an image processor). In examples, the image data may be provided as input to an image data pre-processor to generate pre-processed image data. Many types of images or formats may be used; for example, compressed images such as in Joint Photographic Experts Group (JPEG), Red Green Blue (RGB), or Luminance/Chrominance (YUV) formats, compressed images as frames stemming from a compressed video format (e.g., H.264/Advanced Video Coding (AVC), H.265/High Efficiency Video Coding (HEVC), VP8, VP9, Alliance for Open Media Video 1 (AV1), Versatile Video Coding (VVC), or any other video compression standard), raw images such as originating from Red Clear Blue (RCCB), Red Clear (RCCC) or other type of imaging sensor. In some examples, different formats and/or resolutions could be used for training the machine learning model(s) than for inferencing (e.g., during deployment of the machine learning model(s)).

In some embodiments, a pre-processing image pipeline may be employed by the image data pre-processor to process a raw image(s) acquired by a sensor(s) (e.g., camera(s)) and included in the image data to produce pre-processed image data which may represent an input image(s) to the input layer(s) (e.g., feature extractor layer(s)) of the machine learning model(s). An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include one or more processing operations such as, without limitation, decompanding, noise reduction, demosaicing, white balancing, histogram computing, and/or adaptive global tone mapping (e.g., in that order, or in an alternative order).

Where noise reduction is employed by the image data pre-processor, it may include bilateral denoising in the Bayer domain. Where demosaicing is employed by the image data pre-processor, it may include bilinear interpolation. Where histogram computing is employed by the image data pre-processor, it may involve computing a histogram for the C channel, and may be merged with the decompanding or noise reduction in some examples. Where adaptive global tone mapping is employed by the image data pre-processor, it may include performing an adaptive gamma-log transform. This may include calculating a histogram, getting a mid-tone level, and/or estimating a maximum luminance with the mid-tone level.

With respect to pose data, this data is indicative of the pose of the ego-machine and/or sensor(s) with respect to one or more rotation angles and translation parameters (such as yaw, roll, pitch and/or other aspects of the ego-machine's pose). It should be understood that the pose data describing the pose of the ego-machine may be generated and/or received from any one of a variety of sources. For example, in some embodiments, stereo image pairs are captured by the sensors 110 and fed to a VSLAM (Visual Simultaneous Localization and Mapping) pose estimator 114, which computes the pose data component of input data 112. As further examples, the pose data may be computed based on data from visual odometry, LIDAR SLAM, global satellite navigation receivers, and/or data received from external sources (such as a mobile or static statically placed sensor) that can view and determine the pose of at least a portion of the ego-machine. In some embodiments, pose data generated from external sensor data may be computed off-board the ego-machine (and stored in a register or server, for example) and loaded by the iterative volumetric mapping function 102 via the wireless network interface, so that on-board resources of the ego-machine need not be used to compute the pose data.

The iterative volumetric mapping function 102 processes the input data 112 to compute one or both of a distance function (cost map) 104 and a visualization mesh 106.

The cost map 104 may be used by one or more downstream navigation components 124 of the ego-machine, such as the controller(s) 836 discussed below. The downstream navigation components 124, for example, may implement object avoidance navigation functions and/or a world model manager, a path planner, a control component, a localization component, an obstacle avoidance component, an actuation component, and/or the like, to perform operations for controlling the ego-machine through an environment.

For some embodiments, the downstream navigation components 124 may include at least one or more path planning functions 126 (such as the path planning functions discussed herein with respect to ego-machine 800) and actuation and controls 128 (such as the steering or break actuators or other controller discussed herein with respect to ego-machine 800).

For example, the path planning functions 126 may include a configuration space manager, a freespace manager, a reachability manager, and a path evaluator. The configuration space manager may manage a pose configuration space, which represents poses comprising positions and orientations of the ego-machine in its environment. The freespace manager and the reachability manager may process the pose configuration space to determine one or more paths for maneuvering from a current pose to a target pose in the pose configuration space based at least in part on the cost map 104 output from the iterative volumetric mapping function 102. The path evaluator may identify one or more proposed or potential paths for the vehicle based at least on the assessment by the reachability manager.

The visualization mesh 106 can be used for visualization of the physical environment around the ego-machine as observed based on the input data. While not critical for path planning, a renderable surface representation is useful for visualizing the world as perceived by the ego-machine. A surface mesh is one example of such a representation. For example, a renderable surface representation produced from the visualization mesh 106 and displayed on a human-machine interface (HMI) 120 comprising a display would permit remote operation of the ego-machine and/or simply giving an operator a better understanding of the ego-machine's environment. In some embodiments, the visualization mesh 106 may be remotely accessed by an operator or other system via the wireless network interface 118. For example, in some embodiments, the visualization mesh 106 may be transmitted, incrementally, to a remote system.

Figure 2:
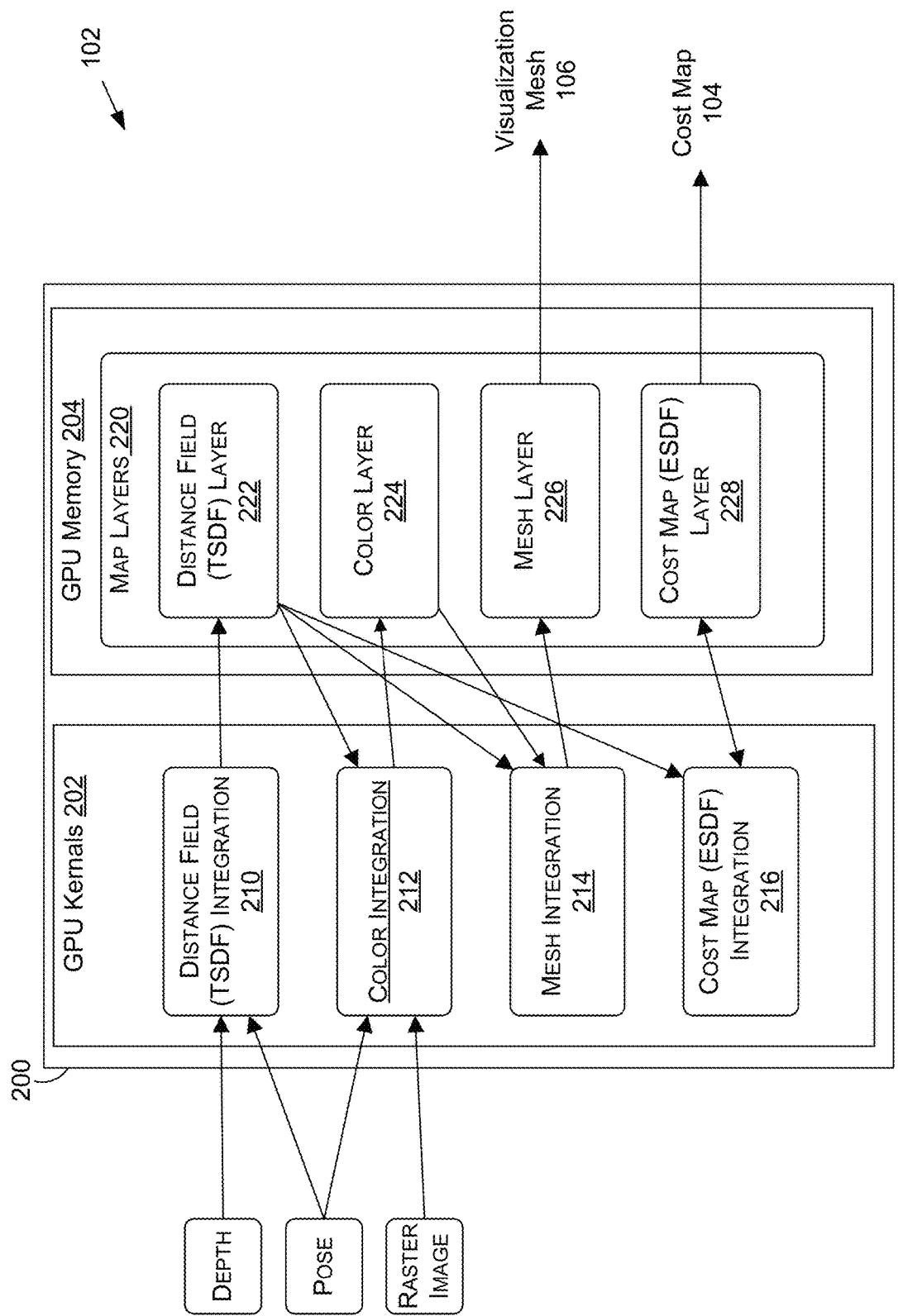
FIG. 2 is a block diagram illustrating of an example iterative volumetric mapping function for an ego-machine, in accordance with some embodiments of the present disclosure.

Now referring to FIG. 2, FIG. 2 is a block diagram illustrating an example iterative volumetric mapping function 102 for at least one embodiment. As shown in FIG. 2, the iterative volumetric mapping function 102 may be carried out in a parallelized manner using a plurality of kernels 202 executed on a graphics processing unit (GPU) 200. The GPU may comprise a multi-core processor having for example, integrated transform, lighting, triangle setup/clipping matrix operation and/or rendering engines for processing large blocks of data in parallel (used to break complex problems into thousands or millions of separate tasks and work them out at once). Voxels marked for updating may be processed in parallel within a computation iteration or cycle. Moreover, subsections of the map are processed incrementally when iterative changes are detected so that voxels in unchanged subsections need not be recalculated. As mentioned above, in other embodiments, the iterative volumetric mapping function 102 may be carried out using a PPU in place of the GPU, or using non-parallel processing units.

As shown in FIG. 2, the iterative volumetric mapping function 102 executes on the GPU 200 using a plurality of kernels 202 that include a distance field integration 210, a color integration 212, a mesh integration 214 and a cost map integration 216. In some embodiments, the VSLAM pose estimator 114 may additionally be implemented using one or more threads by one or more of the kernels 202 executed on GPU 200, and/or may be implemented using one or more threads by another processor. Also as shown in FIG. 2, the GPU memory 204 may be structured as a series of map layers 220. In this embodiment, the map layers 220 include a distance field layer 222, a color layer 224, a mesh layer 226 and a cost map layer 228.

The iterative volumetric mapping function 102 accepts a stream of depth-images, raster-images, and ego-machine poses, and generates the cost maps 104 and the visualization mesh 106. In some embodiments, the iterative volumetric mapping function 102 fuses incoming depth images into a 3D TSDF represented as samples on a 3D voxel grid. To achieve high framerates for real-time perceptive path planning the iterative volumetric mapping function 102 may exploit the parallel nature of this operation to perform TSDF-fusion via a kernel 202 executed on the GPU 200. Moreover, voxel hashing can be used in order to sparsely allocate memory 204 corresponding to the observed part of the scene and explicitly track observations of free-space. In general, path planners, such as the path planning functions 126, operate by testing many potential paths for collision and executing the "best" one. The iterative volumetric mapping function 102 generates a cost map 104—which may be in the form of an ESDF—that is used by the path planning functions 126 for this purpose. As explained below, an ESDF may express the shortest distance from a position of a sampled 3D element to a surface of an object.

Referring first to the distance field integration 210, this stage of the iterative volumetric mapping function 102 pipeline is to integrate incoming depth and pose information into a distance field (e.g., a TSDF) that may be stored in a dense voxel grid with fixed-size voxels. The grid contains voxels with two values: distance and weight. Distance may represent the distance to the nearest surface along a projection ray and a sign (+ is in front of surface, − is behind the surface), truncated to a very small radius around the surface (within 2 to 4 voxels, or within another threshold distance, for example). The weight may be a measure of how confident the distance is—usually weight is a function of how many times each voxel has been observed. The distance field integration 210, in some embodiments, is implemented using a parallelized TSDF integration scheme on the GPU 200. A TSDF is a quickly computed, which may be a flexible distance field map representation that implicitly computes the position of a surface using zero crossings.

Figure 4:
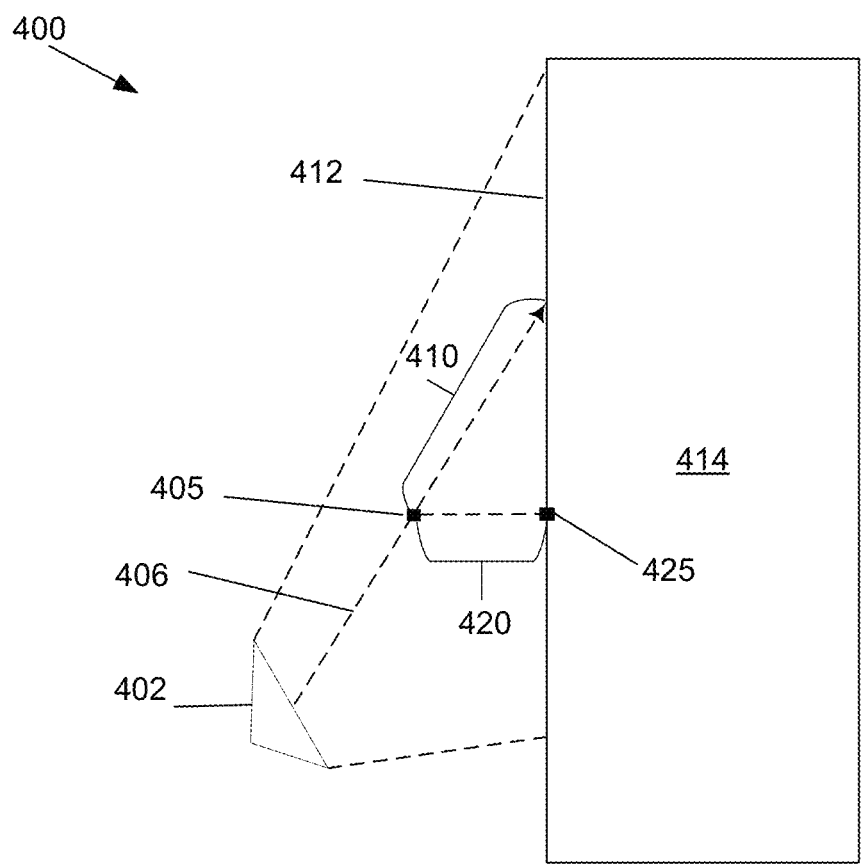
FIG. 4 is an illustration of characteristics of a projected distance and Euclidean distance for a voxel, in accordance with some embodiments of the present disclosure.

The TSDF may represent a reconstruction of the environment around the ego-machine. The TSDF may be determined based at least on viewing the environment as a volume of space rather than just as a collection of surfaces, and generating a virtual reconstruction as a volume by processing depth images and projecting them into a three-dimensional (3D) grid. For each 3D voxel represented in the grid of the TSDF, each voxel is either located in front of a surface or behind a surface. Referring to FIG. 4 at 400, FIG. 4 illustrates the characteristics of a projected distance field (e.g., TSDF) representation of a voxel. The projective distance measurement for a given voxel (shown at 405) comprises a distance 410 to the surface 412 of a physical object 414 along the ray direction of a ray 406 extending from the sensor 402 (e.g., from a center of the sensor) through the voxel 405 to a point on the surface 412. The TSDF is truncated to only have values for voxels very near the surface 412, allowing for greater compression. As shown in FIG. 2, the output of the distance field integration 210 is stored into the distance field layer 222 of the map layers 220, where the projected distance is stored for each voxel represented in the distance field (either in front or behind the surface 412).

Referring to the color integration 212, this stage of the iterative volumetric mapping function 102 pipeline may be used to integrate color information from the raster images of the input data 112, if such color information is present. In some embodiments, the current state of the TSDF is obtained from the distance field layer 222, and using pose data and raster image data from the input data 112, the color integration 212 re-projects the current state of the TSDF into a synthetic depth image from the pose of the color camera. The color integration 212 may then perform similar integration as was performed for computing the TSDF, but with integrating color (RGB) and weight instead of distance. As is done for computing the TSDF, color integration may be limited to integrating color for a thin band (e.g., 2-4 voxels) around the surface 412. The output from the color integration 212 comprises a color integrated map corresponding to the TSDF, which is stored to the color layer 224 of the map layers 220.

Referring to the mesh integration 214, this stage of the iterative volumetric mapping function 102 pipeline may be used to compute a polygonal mesh (such as a triangle mesh, for example) representation for the TSDF using as input the current TSDF from the distance field layer 222 and the color integrated map from the color layer 224. In some embodiments, the mesh integration 214 applies a Marching Cubes algorithm (or algorithm for extracting a polygonal mesh of an isosurface from a three-dimensional discrete scalar field) on the TSDF voxel grid to reconstruct a best guess at the triangle mesh represented by the TSDF volume. In some embodiments, input from color layer 224 may be omitted, for example, in cases where the input data 112 does not include color information. The output from the mesh integration 214 is stored to the mesh layer 226 as the visualization mesh 106. While not critical to path planning, the visualization mesh 106 may be useful for other purposes, such as visualizing the world as perceived by the ego-machine, which may be used for visualization of the ego-machines surrounding environment as well as remote operation of the ego-machine.

Referring to the cost map integration 216, this stage of the iterative volumetric mapping function 102 pipeline may be used to compute a cost map (e.g., an ESDF) that is stored in a dense voxel grid with fixed-size voxels. Referring again to FIG. 4, at 400, FIG. 4 also illustrates the characteristics of ESDF representation of voxel 405. The distance measurement for voxel 405 in a cost map (ESDF) may comprise a Euclidean distance 420 to the surface 412 of the physical object 414 from the voxel 405. The cost map, for each free voxel in the map, may represent the Euclidean distance to the nearest occupied voxel 425, for example, the nearest voxel at least partially occupied by the surface 412 of object 414. As shown in FIG. 2, the output of the cost map integration 216 is stored into the cost map layer 228 of the map layers 220, where the Euclidean distance is stored for each voxel represented in the cost map (either in front or behind the surface 412).

The output of the cost map integration 216 that is stored to the cost map layer 228 comprises, for each voxel, information such as: distance to a site on the surface 412 (the term "site" herein may refer to a voxel believed or determined to lie on a surface), whether that voxel has been observed, and whether that voxel is itself a site. The updates stored to the cost map layer 228 update the cost map 104 that may be used for path planning.

Figure 3:
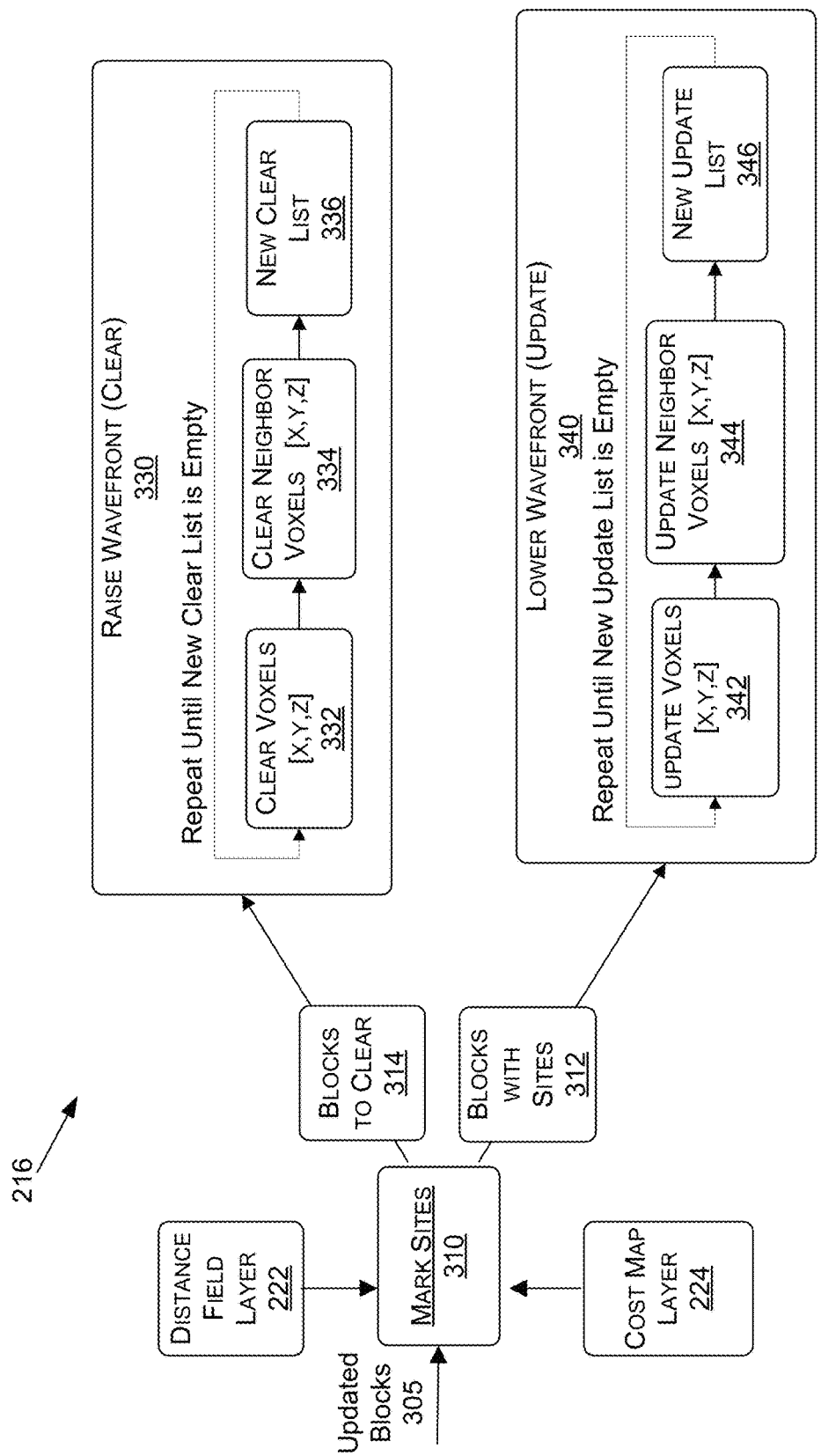
FIG. 3 is an illustration of an example flow diagram for computing a cost map as performed by an iterative volumetric mapping function of an ego-machine, in accordance with some embodiments of the present disclosure.

The process for computing the cost map as performed by the cost map integration 216 is further described with reference to FIG. 3. In some embodiments, voxels in each of the map layers 220 are stored as blocks (for example, in blocks of 8×8×8 voxels). These blocks are allocated and can be referenced by their position in the 3D grid. For example, the origin of the grid falls within in the (0, 0, 0) block, and the block above that would have index (0, 0, 1). In some embodiments, the map layers 220 may also be stored in a persistent manner so that when an ego-machine is restarted, it can load the blocks back into the GPU memory 204, where they were previously. As such, the contents of the map layers 220 only need to be updated to reflect what has changed during the time the ego-machine was off-line. In some embodiments, blocks can also be serialized and saved to disk.

Cost map integration 216 may take as input an initial "updated blocks" list 305 from the distance field integration 210. The updated block list 305 identifies all of the blocks of the distance field (e.g., TSDF) that that the distance field integration 210 has computed updated values for during the last processing iteration performed by the distance field integration 210. The updated blocks list 305 is received by the mark sites function 310, which is implemented using one or more threads by the GPU 200 (e.g., as a kernel). In some embodiments, for each of the blocks included on the updated blocks list, the mark sites function 310 processes each voxel in parallel, checking the current state of the voxels against the state as indicated in the distance field layer 222 and the cost map layer 228. As previously mentioned, the term "site" may refer to a voxel predicted to lie on the surface boundary of an object. In the 3D case, mark sites function 310 compares each distance field voxel to its corresponding cost map voxel. Each voxel stored in the cost map layer 228 is updated by the mark sites function 310 based on whether it is considered an "observed" voxel (i.e., having a weight greater than 0) and whether it is considered a "site" voxel (for example, having a projected distance less than or equal to 1 voxel size). There may thus be four potential outcomes: 1) the cost map voxel was previously unobserved and is now observed, 2) the cost map voxel was previously not a site and is now a site, 3) the cost map voxel was previously a site and is now no longer a site, and 4) the "is a site" status is unchanged by the update. For case 1, where the mark sites function 310 determines that a cost map voxel was previously unobserved and is now observed, the existing distance field value from the distance field layer 222 is copied over for use in computing the cost map. For case 4, wherein the voxel was a site and remains a site, the voxel need not be processed any further. For case 2, where the block includes a voxel that was previously not a site but has become one, the block comprising that voxel is added to the "blocks with sites" list (shown at 312). This will ensure the block is processed in the subsequent update/lower wavefront processes 340. For case 3, where a block includes a voxel that was a site and but is no longer a site, every voxel that points to it as its parent site (that is, the voxel from which distance was measured) has its distances invalidated. This is performed in the clear/raise wavefront process 330. These voxels have their distance values reset to a maximum distance and are entered into the blocks to clear list 314.

It should be noted that the cost map integration 216 can process the updated blocks in full 3D (as described above) or using a 2D slice that takes into consideration the full height of the ego-machine. For processing a 2D slice, the mark sites function 310 first accumulates a minimum distance measurement across the entire vertical swath that falls within the ego-machine's height (that is, between a selected minimum z-axis value and a maximum z-axis value corresponding to the height of the ego-machine). If any voxel within the swath is an observed voxel, then the mark sites function 310 categorizes the voxel of the 2D slice as observed. The processes otherwise remains the same as for 3D processing, with processing the z-axis omitted.

With respect to the raise wavefront 330 and lower wavefront 340, although they are similar in structure, the actual operations and comparisons they compute may be substantially different. The raise wavefront 330 inputs the blocks to clear 314 list as an initial list of block to process. Clearing of voxels within the blocks is applied at 332, propagating the clear wave one axis at a time (for example, to the x-axis, then y-axis, then z-axis). A neighbors table is constructed by the raise wavefront process 330 identifying the neighboring blocks for each of the blocks processed at the clear voxels 332 function, and where the voxels for those neighboring block's voxels are stored in the GPU memory 204. The clear neighbors 334 function in the next stage is to clear neighbors on block boundaries by looking up two adjacent voxels, each on the boundary of its respective block. If that voxel can be cleared, then the entire block is added to the new clear list 336 that is propagated back to the clear voxels 332 function. The process between the clear voxels 332 and clear neighbors 334 function are repeated, clearing neighbors within the block and then checking if adjacent blocks can be cleared, until no more neighbors can be cleared (that is, until the new clear list 336 is empty).

The lower wavefront 340 inputs the blocks with sites 312 list as an initial list of blocks to process. Updating of voxels within the blocks is applied at 342, propagating the update wave one axis at a time (for example, to the x-axis, then y-axis, then z-axis). A neighbors table is constructed by the lower wavefront process 340 identifying the neighboring blocks for each of the block processed at the update voxels 342 function, and where the voxels for those neighboring block's voxels are stored in the GPU memory 204. The update neighbors 344 function is the next stage and may be used to update neighbors on block boundaries by looking up two adjacent voxels, each on the boundary of its respective block. If that voxel can be updated, then the entire block is added to the new update list 346 that is propagated back to the update voxels 342 function. Updating of neighbor voxels is based on a comparison of distances. That is, if updating a voxel's parent site could lower its distance, then the neighbor voxel is updated. The process between the update voxels 342 and update neighbors 344 function are repeated, updating neighbors within the block and then checking if adjacent blocks can be updated, until no more neighbors can be updated (that is, until the new update list 346 is empty).

The following difference between the raise wavefront 330 and lower wavefront 340 should be noted. In the raise wavefront 330, cleared voxels are propagated (that is, voxels whose parent site has been reset). When a voxel is cleared, then the raise wavefront 330 checks its voxel neighbors and if those neighbor's parent directions point to the cleared voxel, then the neighbor voxels are cleared as well. The cost map integration 216 first executes the raise wavefront 330 process. Once no more blocks can be cleared, then the cost map integration 216 executes the lower wavefront 340 process. Once no more blocks can be updated (the new update list is empty), execution of the cost map integration 216 for that GPU execution iteration may be terminated as the cost map 104 stored in the cost map layer 228 is up-to-date.

In at least one embodiment, the sensors 110 may collect input data 112 from one or more directions around the ego-machine in addition to data relevant to the forward direction of travel. In that case, the distance field integration 210 may be applied to each set of input data 112 for the one or more different directions, and the cost map 104 is updated by the cost map integration 216 again performed on the blocks indicated on the updated blocks list 305 produced by the distance field integration 210.

The path planning function 126 uses the cost map 104 to plan a path of travel for the ego-machine that avoids collisions with obstacles, and more specifically uses the cost map 104 to find the path with the least cost. For example, increases in cost indicated by the cost map 104 may correspond to increases in the likelihood of hitting an obstacle, where the closer the ego-machine is to the obstacle, the higher the costs indicated by the cost map 104. In some embodiments, the path planning function 126 may use the cost map 104 in conjunction with other factors to plan the path, such as avoiding a path through a busy zone where people or other ego-machines are operating. In some embodiments, such factors may be added to the cost map 104 as additional costs, by other processes executed on the ego-machine. One distinct advantage of having the cost map 104 (e.g., ESDF) generated by the iterative volumetric mapping function 102 is that it alleviates computational burden on the path planning function 126. That is, instead of merely outputting a 2D or 3D perception-based view of where obstacles are, and forcing the path planning function 126 to compute the costs of collision based on perceived distance to an object, the cost map 104 provides the path planning function 126 with a layout indicating where objects are as well as information indicating a probability of a collision along a potential planned path in which the ego-machine draws near those objects.

With respect to the data structure provided by the map layers 220, typical volumetric mapping systems discretize space into a 3D grid. Each voxel of this grid resides in memory and stores a single value of the mapped quantity. For example, in the case of a TSDF reconstruction, this value of an element in the distance field is the signed distance to the closest projected surface. For example, a voxel at position (x, y, z)=(1.0 m, 2.0 m, 3.0 m) of the distance field might store the value sdf=0.5 m, indicating that the voxel 1.0 m forward, 2.0 m left, and 3.0 m up has a projected distance of 0.5 m from a surface in its vicinity. For reconstruction pipelines (e.g., pipelines used in computer graphics systems rather than robotic mapping systems), TSDF values are enough because the TSDF values alone can facilitate extraction of the real-world surface represented as, for example, a triangle mesh. Such a surface model can be an object of interest for use in further tasks, for example rendering in a viewer or bringing into a larger virtual 3D world (digital twin construction). Therefore, in reconstruction pipelines, building of volumetric representations stops at computation of a TSDF, and further tasks use the surface model computed from the TSDF. For ego-machine path planning, only computing a TSDF may not be sufficient.

Like a TSDF, an ESDF is stored in a 3D grid of voxels and this grid may be collocated with the TSDF grid. The ESDF is one example of a volumetric data-based cost map which provides distinct utility for ego-machine path planning. That said, there may exist several additional quantities of interest which are spatially varying and desirable to represent in memory as a 3D grid. For example, the ego-machine may comprise a cleaning robot for keeping debris off the floor. It may be desirable for such a robot to be able to distinguish different types of recyclable materials (for example, cans, cardboard, plastics) from each other, and from non-recyclable materials, and store the identified recyclable class of material represented in each voxel. In other embodiments, it may be important for the ego-machine to specifically discern when people are present at each voxel.

The iterative volumetric mapping function 102 therefore may store the various datatypes generated by the various GPU kernels 202 over a 3D grid in the GPU memory 204 as map layers 220. The map layers 220 comprises stacks of layers (such as the distance field layer 222, the color layer 224, the mesh layer 226, the cost map layer 228, and/or other additional layers for other datatypes) in which the grids of each layer are collocated with one another. In some embodiments, the map layers 220 is implemented by a GPU library (which may be referred to herein as the "nvblox" library) comprising algorithms and function for storing the data generated by the kernels 202 into the map layers 220 for fast access, as well as providing tools for interacting with the individual layers of the map layers 220 (such as, but not limited to saving and retrieving data). The nvblox library, and the map layers 220 it implements, may not specify the datatype stored in each layer and may be agnostic as to the datatype stored in each layer. For example, a developer using the nvblox library may have the latitude to specify what type of data is to be stored at each voxel, and the code for that layer of the map layers 220 may be generated at compile time. This flexibility may be particularly advantageous for ego-machine type robotics as compared to existing, reconstruction-targeted TSDF libraries.

In some embodiments, the GPU kernels 202 may operate in conjunction with one or more software applications executed on a CPU (such as any of the controllers 836) that functions as the interface between the iterative volumetric mapping function 102 and other hardware and/or software elements of the ego-machine. For example, the iterative volumetric mapping function 102 may be provided the input data 112 via the CPU executed applications and/or functions, and provide the cost maps 104 and/or visualization mesh 106 to other components of the ego-machine via the CPU executed applications and/or functions.

Figure 5A:
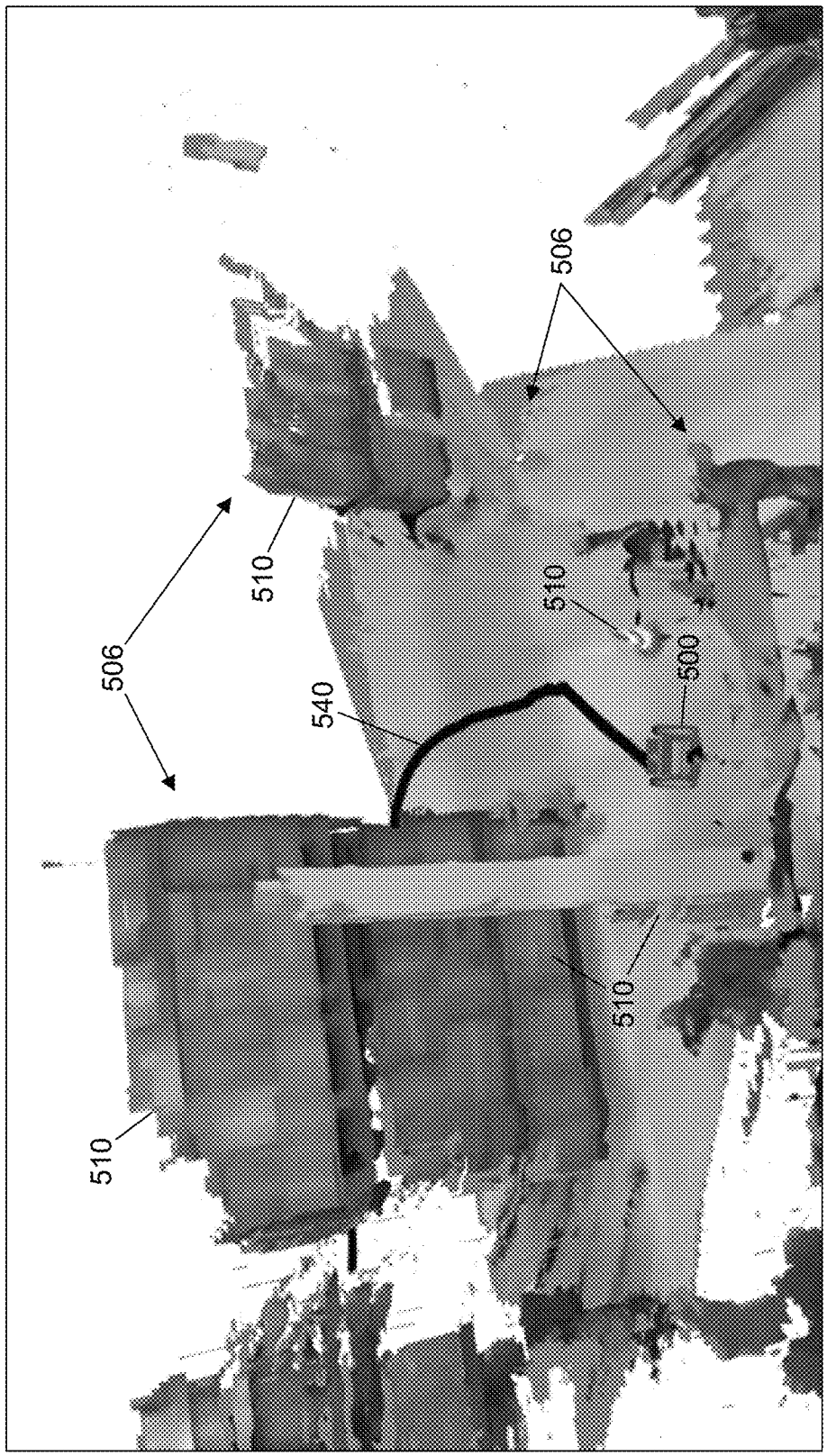
FIG. 5A is a diagram illustrating an example visualization mesh, in accordance with some embodiments of the present disclosure.
Figure 5B:
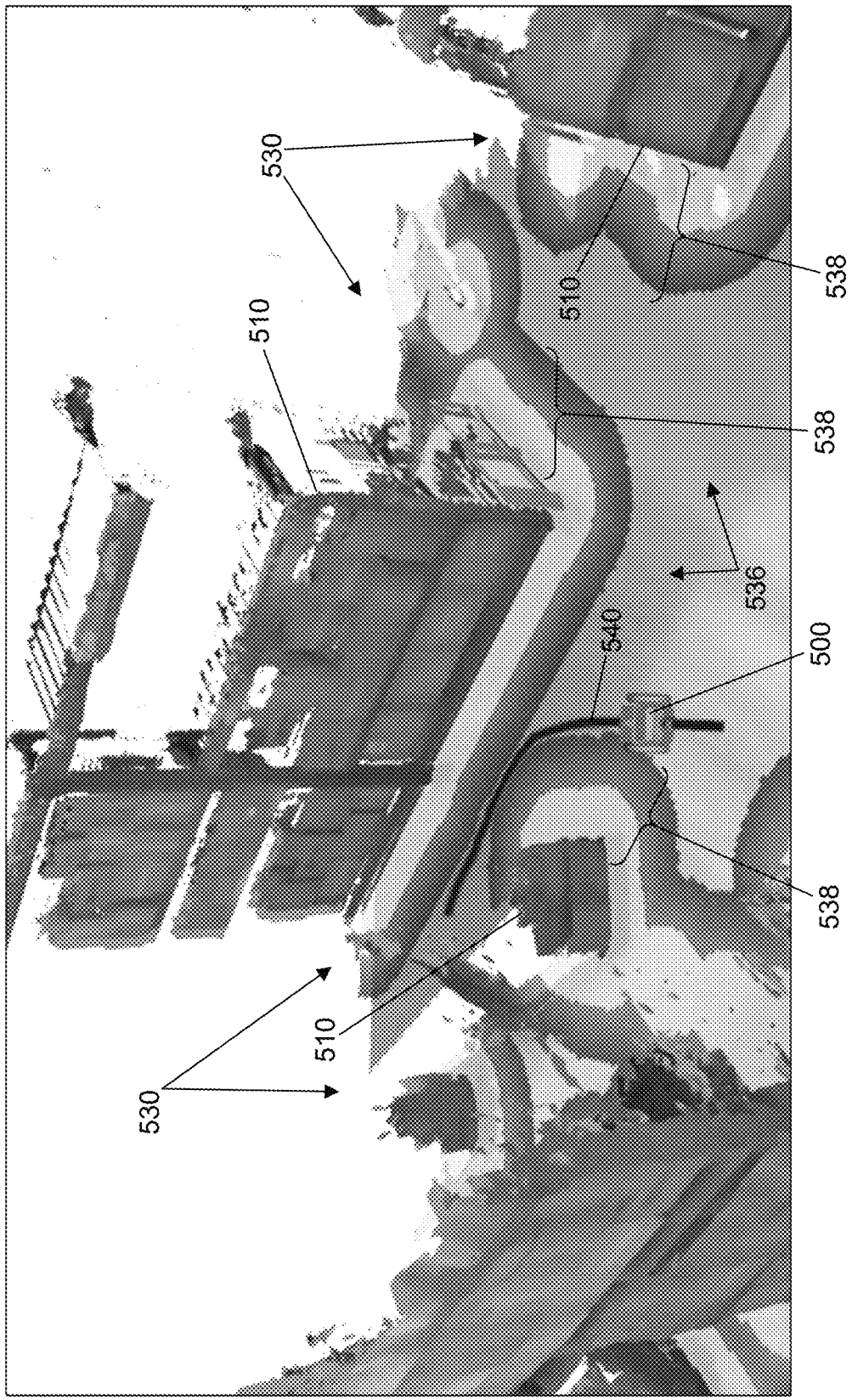
FIG. 5B is a diagram illustrating an example cost map, in accordance with some embodiments of the present disclosure.

FIGS. 5A and 5B illustrate example paths planned by the path planning functions 126 in the context of the visualization mesh 106 and costs maps 104 computed by the iterative volumetric mapping function 102. In FIG. 5A, a visualization mesh 506 depicts the surface structure, texture, and color, of objects 510 present in the environment of an ego-machine 500. FIG. 5B further shows in the context of a visualization mesh a cost map 530 (e.g., an ESDF) computed by the iterative volumetric mapping function 102 and stored in the cost map layer 228. Those voxels in the cost map 530 appearing away from objects 510 (such as at 536) may have little or no cost values assigned to them in the cost map 530. However, as shown at 538, the cost map 530 may include bands of voxels with costs values that increase as their distance from the surface of objects 510 decreases. The closer the ego-machine 500 is to an object, the higher the cost may be to occupy that position per the cost map 530, as determined from the cost map 104. The path planning function 126, may thus input a cost map 104 comprising the cost map 530, and plan a path 540 for ego-machine 500 that seeks to minimize costs for the purpose of avoiding collisions between the ego-machine 500 and the objects 510.

Figure 6:
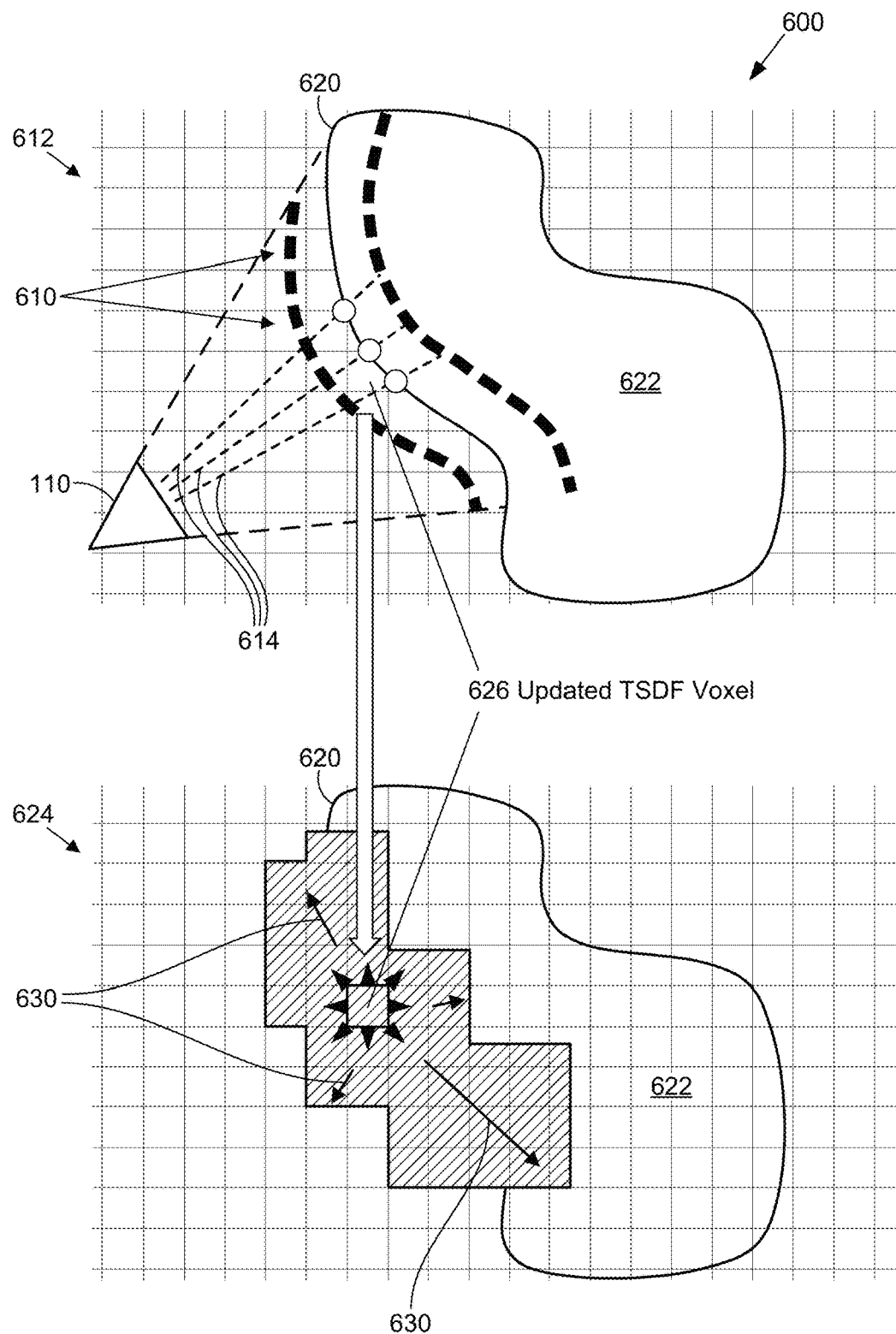
FIG. 6 is an illustration of an example for constructing an update to a cost map based on an updated distance field, in accordance with some embodiments of the present disclosure.

FIG. 6 illustrates at 600 an example according to one embodiment of constructing an update to a cost map (ESDF) based on an updated distance field (TSDF), such as performed by the cost map integration 216 discussed above. In FIG. 6, one or more sensors 110 capture input data 112 that represents information about a surface 620 of an object 622 in the environment of the ego-machine. Based on depth and pose input data 112 captured by sensor(s) 110, the TSDF distance field integration 210 may ray-cast a point cloud 610 onto a grid of the distance field (shown at 612). Those voxels along the path of each ray 614 that have changed, are updated (for example, based on a weighted average of distances) up to a truncated distance in front of and behind the surface 620.

Blocks that have updated voxels are included in the updated blocks list 305 provided by the distance field integration 210 to the cost map integration 216 to update the grid of the cost map (shown at 624). In some embodiments, based on the new distances indicated in the updated distance field layer 222, blocks are assigned by the mark sites function 310 to either the blocks to clear 314 list or blocks with sites 312 list. For example, given a block on the updated blocks list 305 comprising an updated distance field voxel (shown at 626), the cost map integration 216 may apply either the raise wavefront 330 or the lower wavefront 340 to update the corresponding voxel 626 in the cost map grid 624, and propagate the change (either the clearing or the update) to neighboring blocks (shown by 630). Once invalidated voxel values are cleared by the raise wavefront 330 process, the lower wavefront 340 process checks to see if distances of neighbor voxels can be lowered, and that wavefront propagated until no further neighboring voxels need updating.

Figure 7:
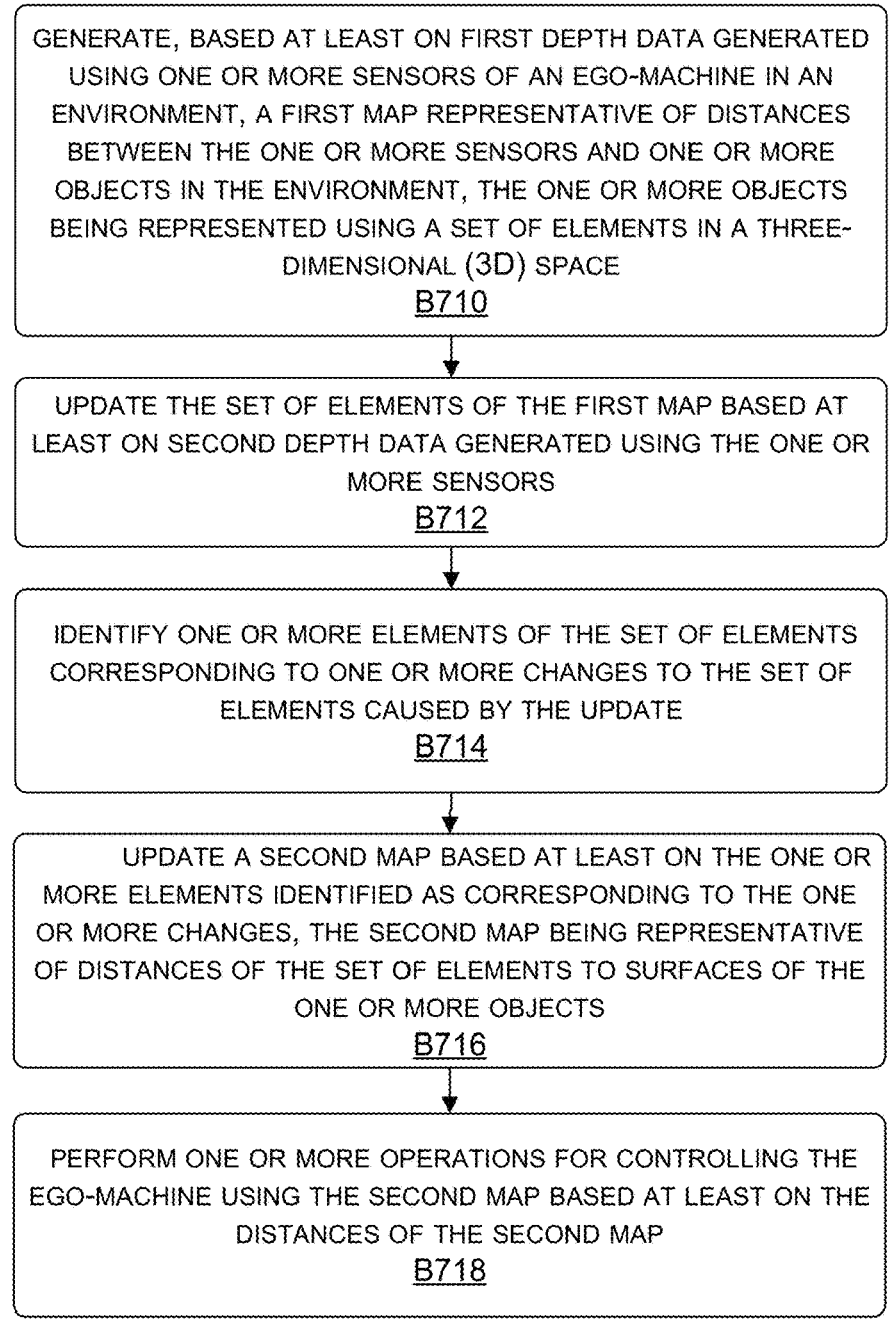
FIG. 7 is flow chart illustrating a method for volumetric mapping for an ego-machine, in accordance with some embodiments of the present disclosure.

FIG. 7 is a flow diagram showing a method 700 for volumetric mapping for an ego-machine, in accordance with some embodiments of the present disclosure. Each block of method 700, described herein, comprises a computing process that may be performed using any combination of hardware, firmware, and/or software. For instance, various functions may be carried out by a processor (such as a GPU, PPU and/or CPU) executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few.

In addition, method 700 is described, by way of example, with respect to the iterative volumetric mapping function 102 included in the process 100 of FIG. 1. However, this method 700 may additionally or alternatively be executed by any one system, or any combination of systems, including, but not limited to, those described herein. It should therefore be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa.

The method 700 is drawn to ego-machine path planning. Generally, the method 700 comprises generating a cost map based at least on a first distance field corresponding to surfaces of objects, the first distance field computed based at least on one or more updates to one or more elements of a second distance field corresponding to distances to the object, the second distance field computed based at least on input data from one or more sensors of a machine. In some embodiments, a cost map for determining a path of travel for an ego-machine is based on a Euclidean Signed Distance Field (ESDF) computed based at least in part on updates to one or more blocks of voxels of a Truncated Signed Distance Field (TSDF). The TSDF may be computed based at least in part on input data from one or more sensors of the ego-machine. In some embodiments, the method 700 may optionally further comprise generating on the graphics processing unit a polygonal mesh representation of the TSDF based at least in part on using a color integration map computed based at least in part on the input data from the one or more sensors of the ego-machine.

The method 700 includes, at B710, generating, based at least on first depth data generated using one or more sensors of an ego-machine in an environment, a first map representative of distances between to the one or more sensors and one or more objects in the environment, the one or more objects being represented using a set of elements in a three-dimensional (3D) space. In some embodiments the first map comprises a TSDF represented as a first plurality of samples on a 3D voxel grid, and may be computed based at least in part on input data generated using one or more sensors of an ego-machine (e.g., depth images and pose data).

The method 700, at B712, includes updating the set of elements of the first map based at least on second depth data generated using the one or more sensors, and at B714 includes identifying one or more elements of the set of elements corresponding to one or more changes to the set of elements caused by the update. For example, in some embodiments, the method identifies all of the blocks of the first map that the distance field having updated values since the last processing iteration. In some embodiments, for each of the updated blocks the method processes each voxel in parallel, checking the updated state of the voxels against the state as indicated in the distance field layer and the cost map layer.

The method 700, at B716, includes updating a second map based at least on the one or more elements identified as corresponding to the one or more changes, the second map being representative of distances of the set of elements to surfaces of the one or more objects. In some embodiments, the second map comprises an ESDF represented as a second plurality of samples on the 3D voxel grid, and the second map may be computed based at least in part on the elements identified as corresponding to the one or more changes (e.g., updates to one or more blocks of voxels of the first map). In some embodiments, the updates to the second map are performed at least in part by iteratively propagating updates to the second map based on the updated state of the one or more elements identified as corresponding to the one or more changes.

The method 700, at B718, includes performing one or more operations for controlling the ego-machine using the second map based at least on the distances of the second map. In some embodiments, the method outputs at least one cost map based on the second map, where the at least one cost map indicates the distance between voxels and one or more obstacles in the environment of the ego-machine. The cost map may be used by one or more downstream navigation components of the ego-machine such as the controller(s) 836 discussed below. The downstream navigation components, for example, may implement object avoidance navigation functions and/or a world model manager, a path planner, a control component, a localization component, an obstacle avoidance component, an actuation component, and/or the like, to perform operations for controlling the ego-machine through an environment.

In some embodiments, the method may further generate a third map comprising a polygonal mesh representation of the first map, and output at least one visualization mesh based on the polygonal mesh representation. Each of the maps produced by the method may be stored as one or more layers of a plurality of map layers in a memory. In some embodiments, elements in one or more of the plurality of map layers are stored as blocks using map serialization, wherein each of the blocks are independently referenced by an index.

Example Autonomous Ego-Machine

Figure 8A:
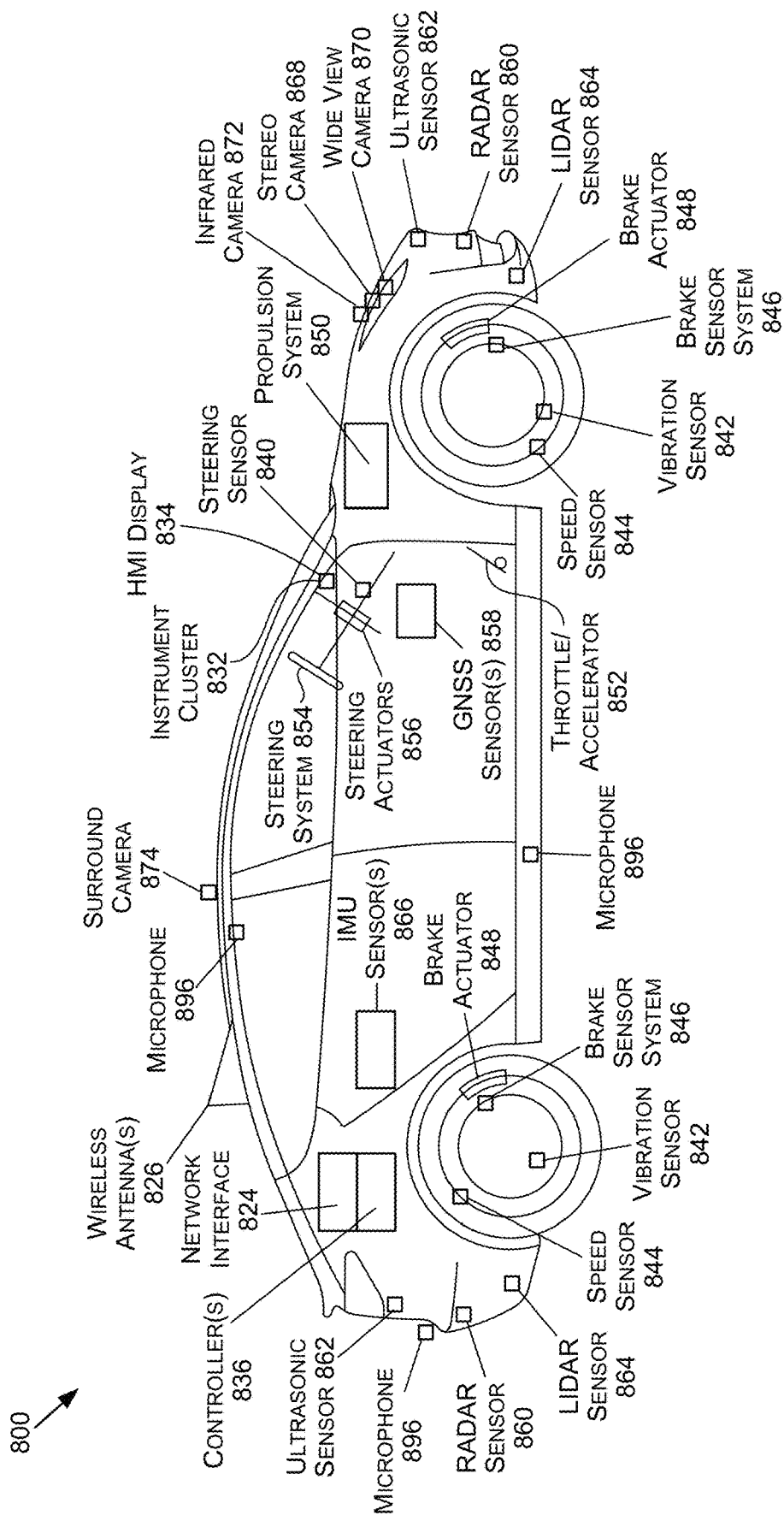
FIG. 8A is an illustration of an example autonomous vehicle, in accordance with some embodiments of the present disclosure.

FIG. 8A is an illustration of an example autonomous ego-machine 800, in accordance with some embodiments of the present disclosure. The autonomous ego-machine 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, an aircraft, a drone, a flying vessel, piloted and un-piloted robots or robotic platforms, warehouse vehicles, off-road vehicles, a vehicle coupled to a trailer, and/or another type of vehicle (e.g., that is unmanned and/or that accommodates one or more passengers).

Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof. In some embodiments, the iterative volumetric mapping function 102 may be implemented at least in part by one or more of the controllers 836.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). In some embodiments, the HMI display 834 may display a visual presentation of the visualization mesh 106.

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
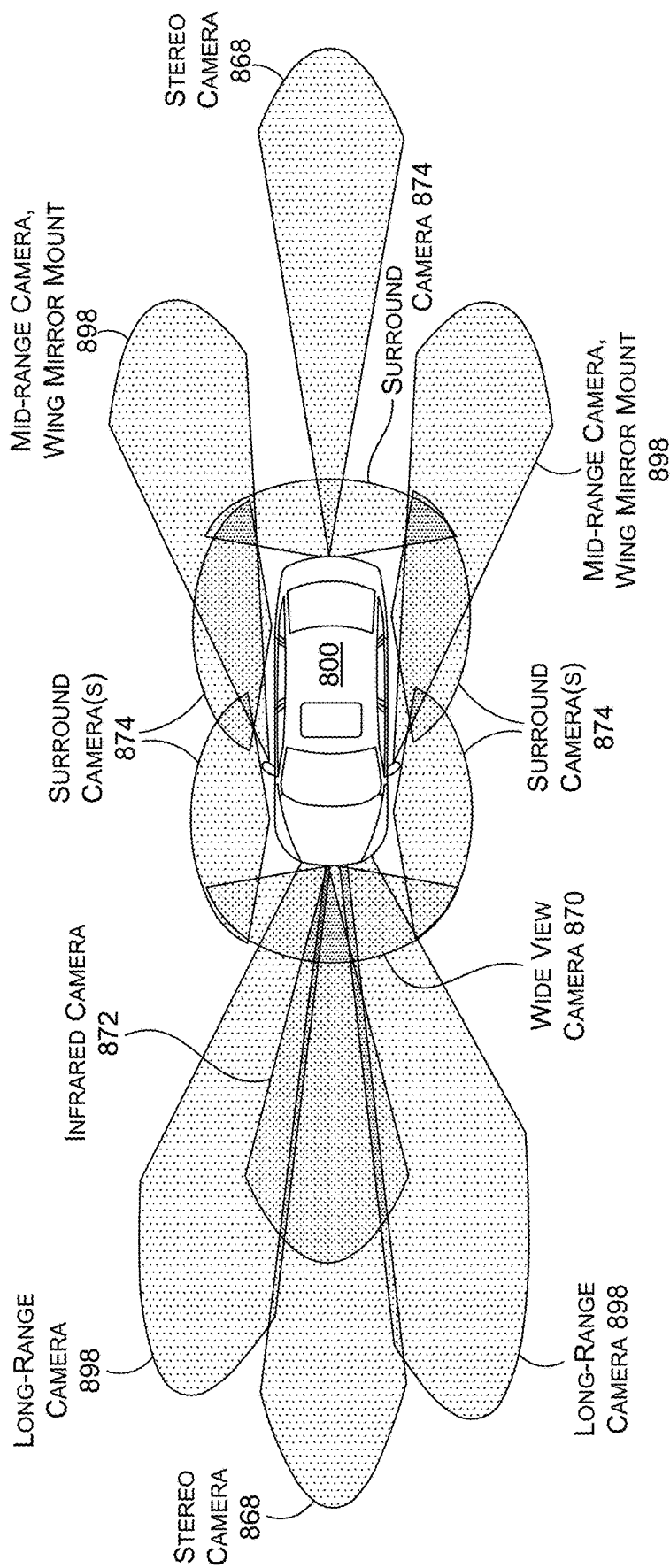
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800. In some embodiments, the sensor(s) 110 providing input data 112 to the iterative volumetric mapping function 102 may include one or more of the cameras shown in FIG. 8B.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
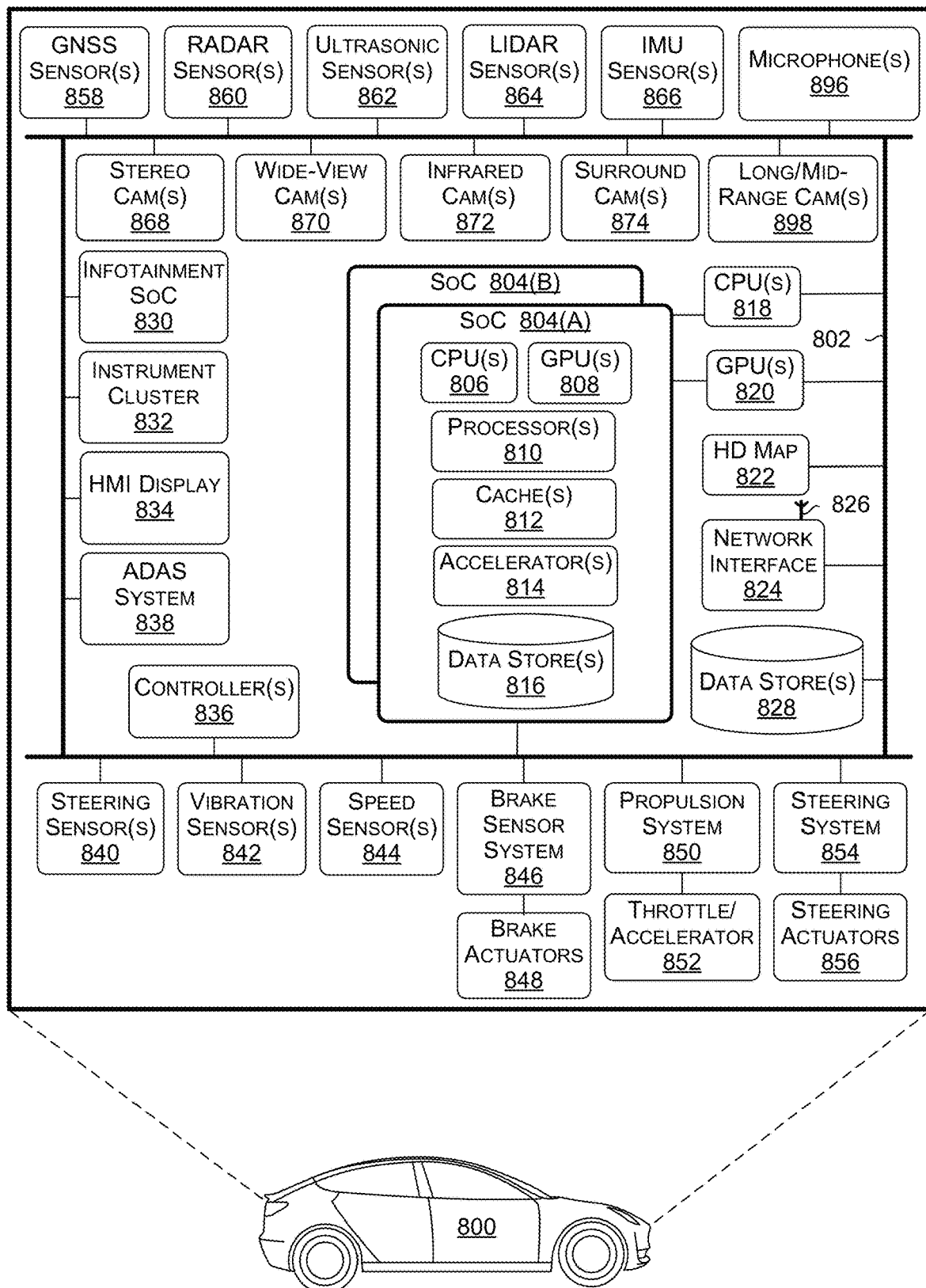
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800. In some embodiments, the wireless network interface 118 corresponds to the network interface 824 such that the iterative volumetric mapping function 102 may receive additional input data captured by off device sensors or other data via the network interface 824.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions (such as the path planning functions 126). Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

In some embodiments, the sensor(s) 110 providing input data 112 to the iterative volumetric mapping function 102 may include one or more of the cameras or sensors discussed with respect to FIG. 8C.

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly.

However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
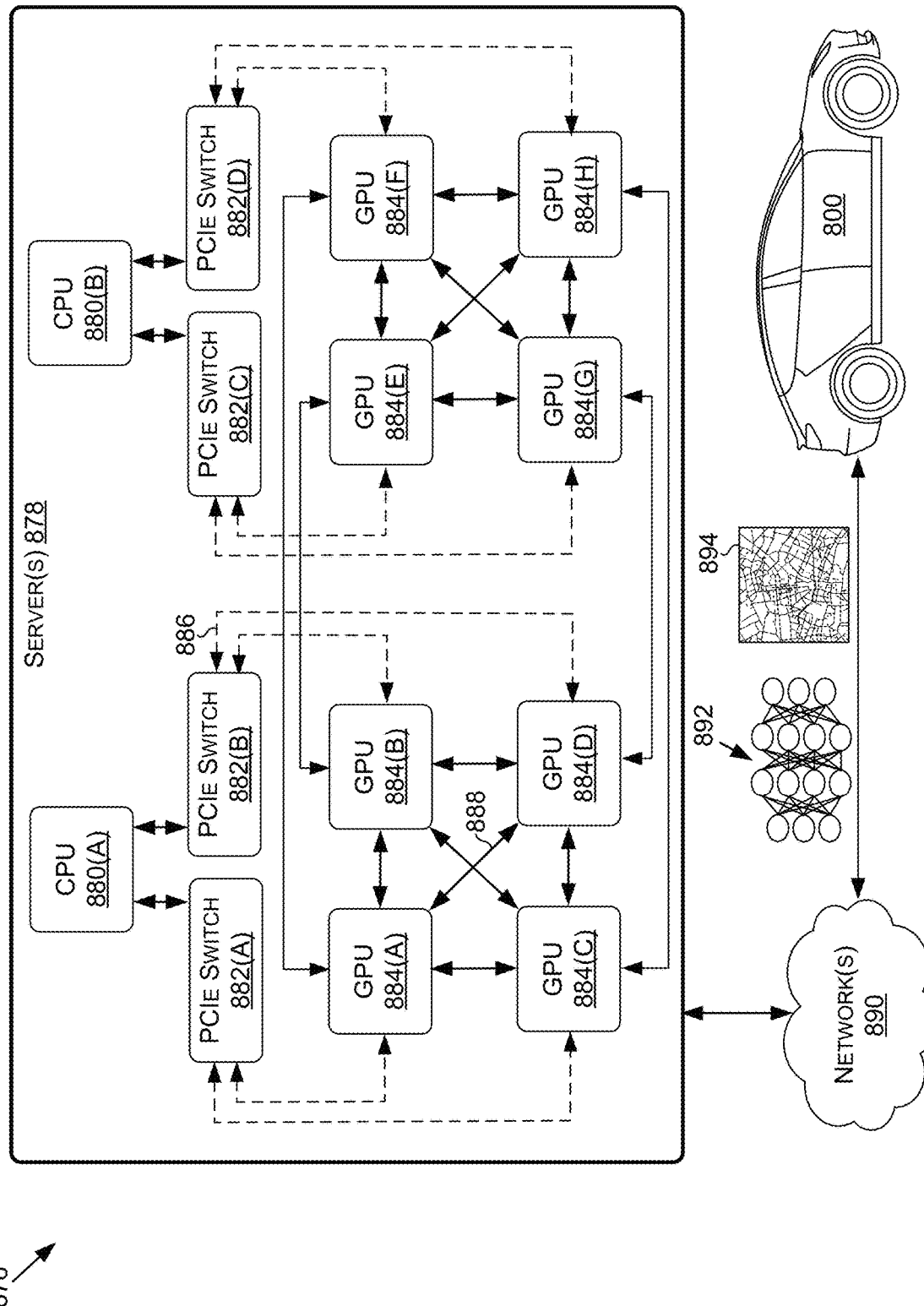
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be synthetically generated in a simulation (e.g., using a game engine), and/or as multi-dimensional (e.g., 2D or 3D) assets of a collaborative content creation platform for heterogeneous content creation applications. In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
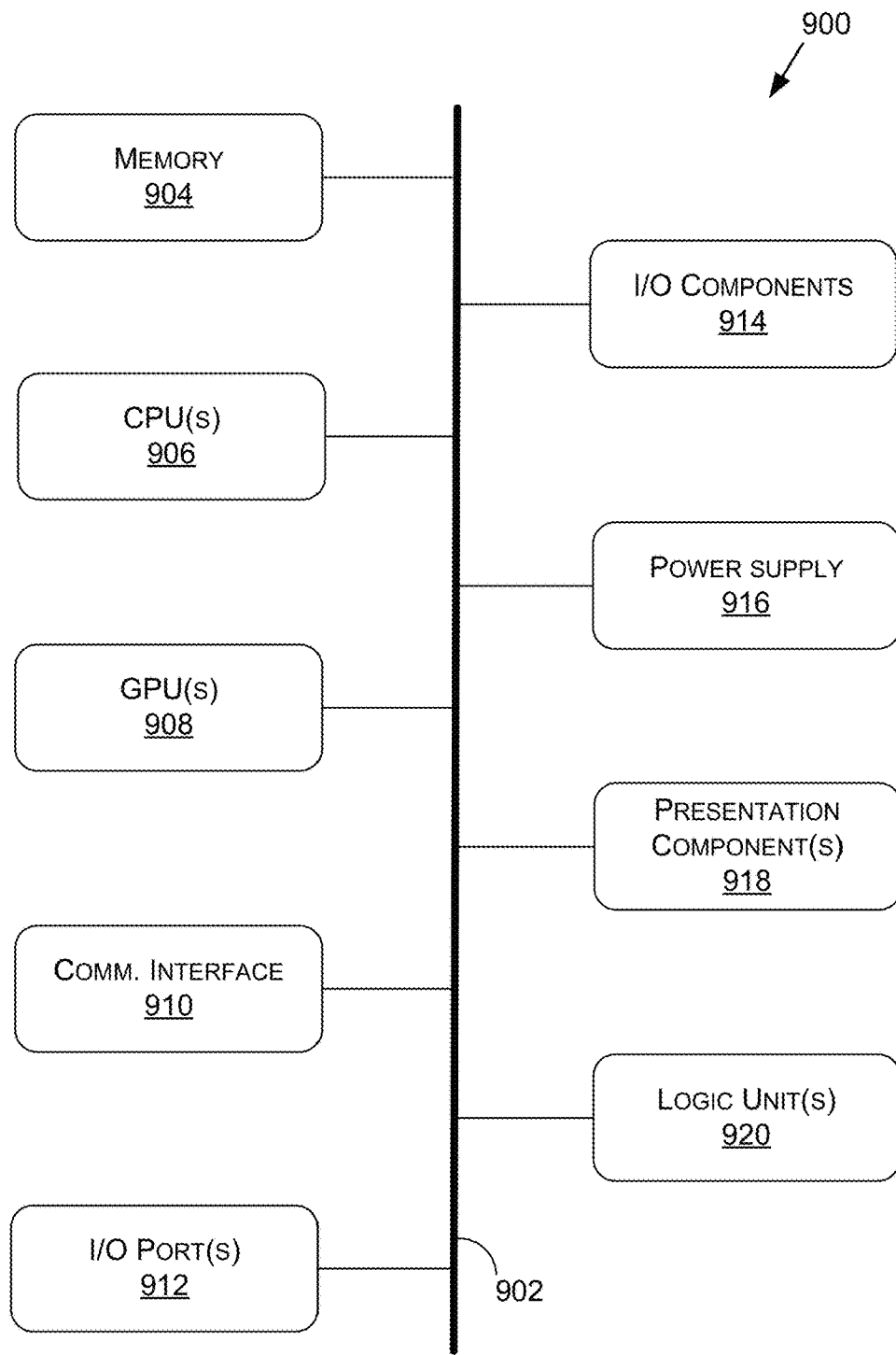
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof. In some embodiments, the iterative volumetric mapping function 102 may be executed at least in part by the GPU(s) 908, CPU(s) 906, and/or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media. In some embodiments, memory 904 may comprise one or more of the map layers 220.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
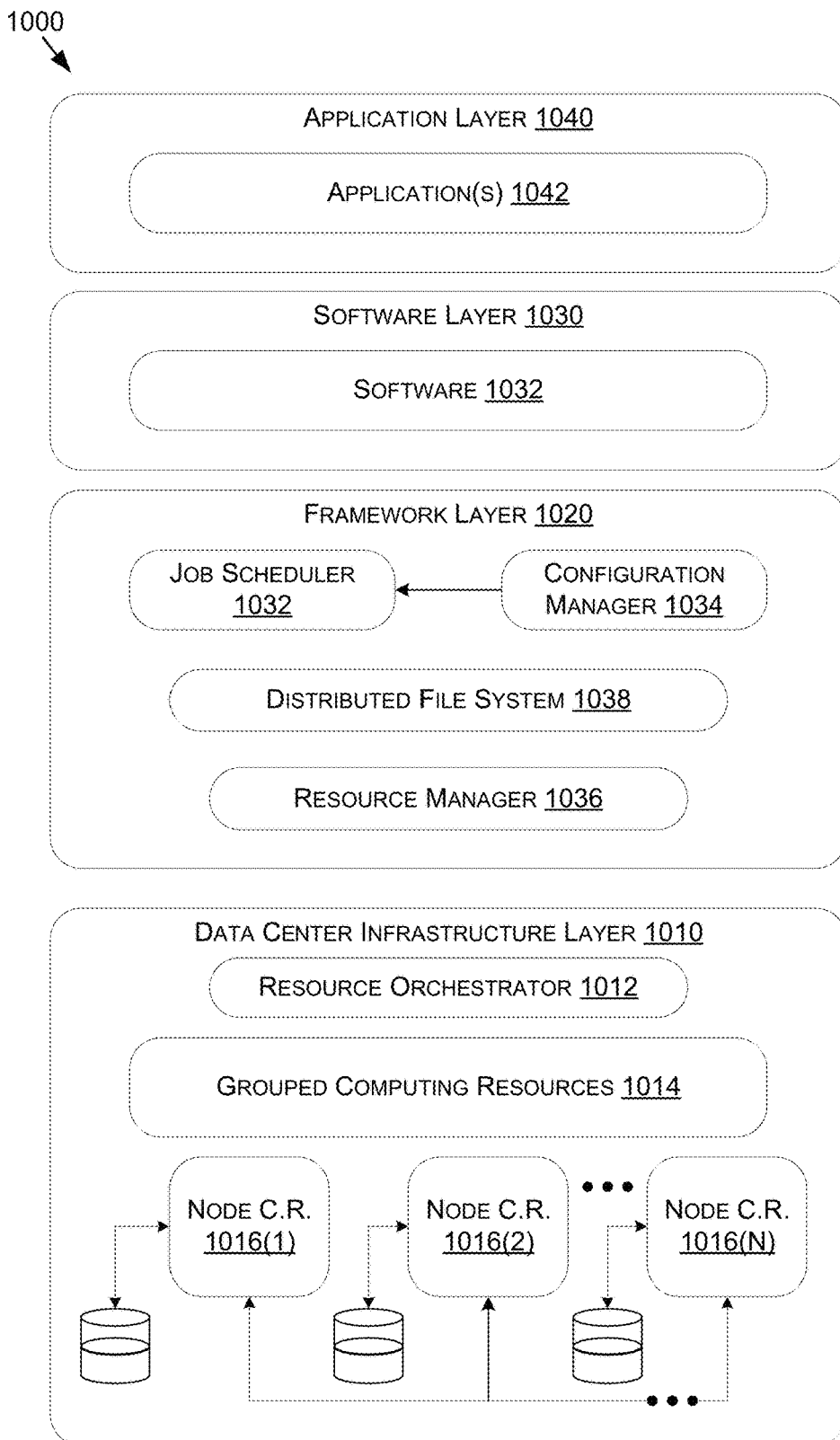
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application (s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor onboard an ego-machine in an environment, the at least one processor comprising:
one or more circuits to:
generate and store to a memory of the ego-machine, based at least on first depth data generated using one or more sensors of the ego-machine, a first map representative of first distance measures, the first distance measures based at least on a ray extending from the one or more sensors and through one or more objects in the environment, the one or more objects being represented using a set of elements in a three-dimensional (3D) space;
update the set of elements of the first map based at least on second depth data generated using the one or more sensors of the ego-machine;
identify one or more elements of the set of elements corresponding to one or more changes to the set of elements caused by the update;
generate an update to a second map in the memory of the ego-machine, the second map different from the first map, the update based at least on the one or more elements identified as corresponding to the one or more changes, the second map being representative of second distance measures different from the first distance measures, the second distance measures based at least on distances of the set of elements to surfaces of the one or more objects; and
perform one or more operations for controlling the ego-machine using the second map based at least on the distances of the second map.

2. The at least one processor of claim 1, wherein the one or more circuits are further configured to:
store the first map as a first one or more layers of a plurality of map layers in the memory; and
store the second map as a second one or more layers of the plurality of map layers in the memory.

3. The at least one processor of claim 2, wherein one or more elements in one or more of the plurality of map layers are stored as one or more blocks, wherein at least one block of the one or more blocks is independently referenced using an index.

4. The at least one processor of claim 1, wherein the one or more circuits are further configured to:
generate a third map comprising a polygonal mesh representation of the first map; and
output at least one visualization mesh based at least on the polygonal mesh representation.

5. The at least one processor of claim 4, wherein the one or more circuits are further configured to:
generate a color integration map based at least on raster-based color information from the one or more sensors, the color integration map comprising a re-projection of the first map on to a synthetic depth image; and
generate the third map comprising the polygonal mesh representation of the first map based at least in part using the color integration map.

6. The at least one processor of claim 5, wherein the one or more circuits are further configured to:
store the first map as a first subset of one or more layers of a plurality of map layers in the memory;
store the second map as a second subset of one or more layers of the plurality of map layers in the memory;
store the third map as a third subset of one or more layers of the plurality of map layers in the memory; and
store the color integration map as a fourth subset of one or more layers of the plurality of map layers in the memory.

7. The at least one processor of claim 1, wherein the one or more sensors include at least one of a stereo camera, an RGB-D camera, a LiDAR sensor, a monocular camera, a surround camera, wide-view camera, a fisheye camera, a long-range camera, a mid-range camera, or a wide view camera.

8. The at least one processor of claim 1, wherein the first map is computed using input data comprising depth-image data and pose data.

9. The at least one processor of claim 1, wherein the one or more circuits are further configured to:
execute a kernel that takes as input the one or more elements identified as corresponding to the one or more changes, and evaluate an updated state of the one or more elements identified as corresponding to the one or more changes against a state as indicated in the first map and a state as indicated in the second map.

10. The at least one processor of claim 9, wherein the one or more circuits are further configured to:
update the second map at least in part by iteratively propagating updates to the second map based on the updated state of the one or more elements identified as corresponding to the one or more changes.

11. The at least one processor of claim 1, wherein the one or more circuits are to compute a path for the ego-machine to travel that avoids collisions with obstacles based at least on the distances of the set of elements to the surfaces, and the one or more operations are based at least on the computed path.

12. The at least one processor of claim 11, wherein the computed path comprises a path through at least one of:
a floor space;
a delineated portion of an environment;
a hallway;
a corridor;
a paved road;
an unpaved road;
a highway;
a driveway;
a portion of a parking lot;
a trail;
a track;
a walking path;
a flight path; or
a runway.

13. The at least one processor of claim 1, wherein the processor is comprised in at least one of:
a control system for an autonomous or semi-autonomous machine;
a perception system for an autonomous or semi-autonomous machine;
a system for performing simulation operations;
a system for generating synthetic data using machine learning;
a system for generating multi-dimensional assets using a collaborative content creation platform;
a system for performing light transport simulation;
a system for performing collaborative content creation for 3D assets;
a system for performing deep learning operations;

a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

14. The at least one processor of claim 1, wherein the first map comprises at least one truncated Signed Distance Field (TSDF) and the second map comprises at least one Euclidean Signed Distance Field (ESDF).

15. A system comprising:
one or more processing units comprising processing circuitry to:
update a set of elements of a first map based at least on depth data generated using one or more sensors in an environment, wherein the update of the set of elements of the first map is executed using a graphics processing unit (GPU) with elements updated in a parallelized manner using a plurality of kernels, the first map representative of first distance measures, the first distance measures based at least on a ray extending from the one or more sensors through one or more objects in the environment, the one or more objects represented using the set of elements in a three-dimensional (3D) space;
update a second map different from the first map, representative of second distance measures different from the first distance measures, the second distance measures based at least on distances between the set of elements and one or more surfaces of the one or more objects, the update to the second map based at least on one or more elements being identified as corresponding to one or more changes to the first map caused by the update; and
perform one or more operations for controlling a machine in the environment using the second map based at least on the distances of the second map.

16. The system of claim 15, wherein the processing circuitry is to execute a kernel comprising a pose estimator to compute pose data, wherein the update to the set of elements of the first map is computed at least in part from the pose data.

17. The system of claim 15, wherein the first map comprises at least one truncated Signed Distance Field (TSDF) and the second map comprises at least one Euclidean Signed Distance Field (ESDF).

18. The system of claim 15, wherein the processing circuitry to is further to:
store the first map as a first set of one or more layers of a plurality of map layers in a memory; and
store the second map as a second set of one or more layers of the plurality of map layers in the memory.

19. The system of claim 15, wherein one or more elements in one or more map layers of the plurality of map layers are stored as one or more blocks, wherein at least one block of the one or more blocks is independently referenced using an index.

20. The system of claim 15, wherein the one or more processing units comprise one or more graphics processing units (GPU).

21. The system of claim 15, wherein the one or more processing units are further to execute a path planning function that computes a path of travel for an ego-machine that avoids collisions with obstacles based at least on the distances between the set of elements and the one or more surfaces.

22. The system of claim 15, wherein the processing circuitry is further configured to update the second map based at least in part by iteratively propagating updates to the second map based on an updated state of the one or more elements identified as corresponding to the one or more changes.

23. A method comprising:
generating, using one or more processing units of an ego-machine, a cost map based at least on a second distance field corresponding to one or more surfaces of one or more objects, the second distance field being computed using the one or more processing unit of the ego-machine based at least in part on one or more updates to one or more elements of a first distance field, the first distance field computed based at least in part on input data from one or more sensors of the ego-machine;
the first distance field representative of first distance measures and based at least on a ray extending from the one or more sensors to the one or more objects; and
the second distance field different from the first distance field and representative of second distance measures based at least on distances of the one or more elements to the one or more surfaces of the one or more objects.

24. The method of claim 23, further comprising generating a polygonal mesh representation of the first distance field based at least in part using a color integration map computed based at least in part on raster-based color information from sensor data generated using the one or more sensors of the ego-machine.

* * * * *